US010346922B2

(12) United States Patent
Steele et al.

(10) Patent No.: US 10,346,922 B2
(45) Date of Patent: Jul. 9, 2019

(54) SYSTEMS AND METHODS FOR PROVIDING INSURER RISK DATA

(71) Applicant: Pareto Intelligence, LLC, Chicago, IL (US)

(72) Inventors: John Steele, Chicago, IL (US); Steven Young, Chicago, IL (US)

(73) Assignee: Pareto Intelligence, LLC, Chicago, IL (US)

( * ) Notice: Subject to any disclaimer, the term of this patent is extended or adjusted under 35 U.S.C. 154(b) by 506 days.

(21) Appl. No.: 14/590,388

(22) Filed: Jan. 6, 2015

(65) Prior Publication Data

US 2016/0196611 A1    Jul. 7, 2016

(51) Int. Cl.
*G06Q 40/08* (2012.01)

(52) U.S. Cl.
CPC .................. *G06Q 40/08* (2013.01)

(58) Field of Classification Search
CPC .............................. G06Q 40/00; G06Q 40/08
USPC ............................................................. 705/4
See application file for complete search history.

(56) References Cited

U.S. PATENT DOCUMENTS

| 7,917,378 B2 | 3/2011 | Fitzgerald et al. | |
| 8,135,600 B2 | 8/2012 | Lassen et al. | |
| 8,527,292 B1 | 9/2013 | Ozden | |
| 8,666,779 B2 | 3/2014 | McGuigan et al. | |
| 2003/0212579 A1* | 11/2003 | Brown | A61B 5/411 |
| | | | 705/2 |
| 2007/0027710 A1 | 2/2007 | Mohr | |
| 2011/0213628 A1 | 9/2011 | Peak et al. | |
| 2012/0215563 A1 | 8/2012 | Amigo et al. | |
| 2012/0303378 A1 | 11/2012 | Lieberman | |
| 2014/0046697 A1 | 2/2014 | Rogers et al. | |
| 2014/0180714 A1 | 6/2014 | Mun et al. | |
| 2015/0347599 A1* | 12/2015 | McMains | G16H 10/60 |
| | | | 707/723 |
| 2015/0347705 A1* | 12/2015 | Simon | G16H 50/30 |
| | | | 705/3 |

OTHER PUBLICATIONS

Title: Business intelligence solutions, URL: http://www.healthscapeadvisors.com/content/business-intelligence-solutions, dated Sep. 23, 2014, 2 pages.
Title: Risk Scoring, URL: http://www.symphonyph.com/Risk-Adjustment.asp, 2 pages.

\* cited by examiner

*Primary Examiner* — Robert R Niquette
*Assistant Examiner* — Liz P Nguyen
(74) *Attorney, Agent, or Firm* — Dinsmore & Shohl LLP

(57) ABSTRACT

Included are systems and methods for providing insurer risk data. Some of the methods include receiving insurance data related to an insurer and determining a captured risk score from the insurance data, the captured risk score being determined by a predetermined calculation. Some of the methods include determining a gap risk score from the insurance data, where the gap risk score being determined from a proprietary calculation that is different than the predetermined calculation, and where the gap risk score identifying a second criteria that was not identified in the captured risk score and the qualifies the insurer for an additional compensation. Some of the methods include providing a user interface that includes data related to the captured risk score and the gap risk score.

20 Claims, 24 Drawing Sheets

SEARCH MEMBER

| HID-11158 | SEARCH | GENERATE MEMBER PROFILE ▶ |

MEMBER PROFILE

MEMBER INFORMATION

| MEMBER ID ▾ | MEMBER NAME ▾ | INITIAL EFFECTIVE DATE ▾ | MEMBER STATUS ▾ | AGE ▾ | GENDER ▾ | RISK POOL ▾ | METAL ▾ | CAPTURED HCCs ▾ | SUSPECTED HCCs ▾ | DEMOGRAPHIC RISK SCORE ▾ | DIAGNOSTIC RISK CAPTURE ▾ | DIAGNOSTIC RISK LOSS ▾ | TARGET RISK SCORE ▾ |
|---|---|---|---|---|---|---|---|---|---|---|---|---|---|
| HID-13158 | JOHN DOE | 01/01/2014 | TERMED | 65 | M | SMALL GROUP | PLATINUM | 1 | 1 | 0.822 | 2.690 | 3.634 | 7.151 |

CAPTURED HCCs

| HCC CATEGORY ▾ | HCC CODE ▾ | HCC DESCRIPTION ▾ | FIRST DATE CODED ▾ | LAST DATE CODED ▾ | RISK UNITS ▾ |
|---|---|---|---|---|---|
| SPECIFIED HEART ARRHYTHMIA | HHS_HCC142 | SPECIFIED HEART ARRHYTHMIA | 02/25/2014 | 04/04/2014 | 2.690 |
| DEMOGRAPHIC | | DEMOGRAPHIC | 01/01/2014 | 05/01/2014 | 0.822 |

1 - 2 OF 2 ITEMS

SUSPECTED HCCs

| RISK LOSS CATEGORY ▾ | RISK LOSS SERVICE ▾ | HCC CATEGORY ▾ | HCC CODE ▾ | HCC DESCRIPTION ▾ | FIRST DATE CODED ▾ | LAST DATE CODED ▾ | RISK UNITS ▾ |
|---|---|---|---|---|---|---|---|
| SUSPECTED | NON-SCORED | ARRHYTHMIA/HEMORRHAGE | HHS_MCC146 | SUDDEN OR UNEXPECTED STROKE | 02/24/2014 | 02/24/2014 | 3.638 |

1 - 1 OF 1 ITEMS

RECENT MEDICAL CLAIMS HISTORY

| ENCOUNTER ID ▾ | HCC CODE ▾ | HCC DESCRIPTION ▾ | FIRST DATE OF SERVICE ▾ | LAST DATE CODED ▾ | DIAGNOSIS CODE ▾ | DIAGNOSIS DESCRIPTION ▾ | HDC ▾ |
|---|---|---|---|---|---|---|---|
| HID-11724 | HHS_HCC142 | SPECIFIED HEART ARRHYTHMIA | 04/04/2014 | 04/04/2014 | 42774 | AORTIAL FIBULATION | N/A |
| HID-15917 | HHS_HCC346 | SPECIFIED HEART ARRHYTHMIA | 01/11/2014 | 05/01/2014 | 43731 | AORTIAL FIBULATION | N/A |

FIG. 8

LOST RISK MEMBERS

[EXPORT TO EXCEL] [EXPORT TO CRV] [EXPORT TO PDF]

DRAG A COLUMN HEADER AND DROP IT HERE TO GROUP BY THAT COLUMN

| | MEMBER ID | MEMBER NAME | INITIAL EFFECTIVE DATE | MEMBER STATUS | AGE | GENDER | RISK POOL | METAL LEVEL | RISK ADJUSTMENT DATE | CAPTURED HCCs | DIAGNOSTIC RISK CAPTURE | DIAGNOSTIC SUSPECTED HCCs | DIAGNOSTIC RISK LOSS | TARGET RISK SCORE |
|---|---|---|---|---|---|---|---|---|---|---|---|---|---|---|
| PROFILE | H10-10000 | JANE DOE | 01/01/2014 | TERMED | 11 | F | INDIVIDUAL | PLATINUM | FEDERAL HHS-HCC | 1 | 0.000 | 1 | 2.526 | 3.051 |
| PROFILE | H10-10002 | JANE DOE | 01/01/2014 | ACTIVE | 11 | F | SMALL GROUP | PLATINUM | FEDERAL HHS-HCC | 1 | 0.000 | 1 | 1.331 | 2.487 |
| PROFILE | H10-10079 | JOHN DOE | 01/01/2014 | ACTIVE | 14 | M | SMALL GROUP | PLATINUM | FEDERAL HHS-HCC | 1 | 1.000 | 1 | 17.237 | 10.927 |
| PROFILE | H10-10004 | JANE DOE | 01/01/2014 | TERMED | 16 | F | SMALL GROUP | SILVER | FEDERAL HHS-HCC | 1 | 0.000 | 1 | 4.401 | 1.506 |
| PROFILE | H10-10056 | JANE DOE | 01/01/2014 | ACTIVE | 20 | F | SMALL GROUP | PLATINUM | FEDERAL HHS-HCC | 1 | 0.000 | 1 | 6.537 | 7.292 |
| PROFILE | H10-10058 | JOHN DOE | 01/01/2014 | ACTIVE | 18 | M | SMALL GROUP | GOLD | FEDERAL HHS-HCC | 1 | 0.000 | 1 | 0.412 | 0.685 |
| PROFILE | H10-10095 | JANE DOE | 01/01/2014 | ACTIVE | 16 | F | SMALL GROUP | PLATINUM | FEDERAL HHS-HCC | 1 | 0.000 | 1 | 1.095 | 2.251 |
| PROFILE | H10-10103 | JOHN DOE | 04/21/2014 | ACTIVE | 10 | M | SMALL GROUP | GOLD | FEDERAL HHS-HCC | 1 | 0.000 | 1 | 3.283 | 4.019 |

1 - 150 OF 2455 ITEMS

FIG. 9

PROVIDERS WITH GAP RISK

ATTRIBUTION MODELS [SINGLE PROVIDER (ALL) ▶]

[EXPORT TO EXCEL] [EXPORT TO CSV] [EXPORT TO PDF]

DRAG A COLUMN HEADER AND DROP IT HERE TO GROUP BY THAT COLUMN

| | PROVIDER ID > | PROVIDER NAME > | PROVIDER GROUP > | SPECIALITY > | SPECIALITY CATEGORY > | PROVIDER SYSTEM > | ACO > | PCNH > | ATTRIBUTED MEMBERS > | CAPTURED RISK > | RISK GAP % CAPTURED > | GAP RISK UNITS > | TARGET RISK UNITS |
|---|---|---|---|---|---|---|---|---|---|---|---|---|---|
| PRV PROFILE | HID-100276 | PROV-100376 | | PSYCHIATRY | PSYCHOLOGY | | | | 1 | 0.000 | 0.000% | 3.132 | 3.122 |
| PRV PROFILE | HID-100284 | PROV-100364 | | PSYCHIATRY | PSYCHOLOGY | | | | 1 | 0.000 | 0.000% | 1.683 | 1.683 |
| PRV PROFILE | HID-100765 | PROV-100765 | | FAMILY PRACTICE | PRIMARY CARE | | | | 1 | 0.000 | 0.000% | 0.295 | 0.395 |
| PRV PROFILE | HID-102890 | PROV-102891 | | CARDIOLOGY/ DISEASE | CARDIOLOGY | | | | 1 | 0.000 | 0.000% | 0.562 | 0.560 |
| PRV PROFILE | HID-105487 | PROV-105487 | | FAMILY PRACTICE | PRIMARY CARE | | | | 1 | 0.000 | 0.000% | 0.488 | 0.488 |
| PRV PROFILE | HID-127444 | PROV-107444 | | FAMILY PRACTICE | PRIMARY CARE | | | | 1 | 0.000 | 0.000% | 1.501 | 1.601 |
| PRV PROFILE | HID-3022 | PROV-3022 | | GENERAL PRACTICE | PRIMARY CARE | | | | 1 | 11.791 | 12.256% | 1.311 | 13.122 |
| PRV PROFILE | HID-332874 | PROV-332874 | | INTERNAL MEDICINE | PRIMARY CARE | | | | 1 | 0.000 | 0.000% | 8.329 | 8.389 |

◀ ① ② ③ ④ ⑤ ▶   1 - 150 OF 715 ITEMS

| CAMPAIGN NAME | CAMPAIGN START | CAMPAIGN END | OWNER | CREATION DATE |
|---|---|---|---|---|
| MEMBER OUTREACH - MEMBERS WITH 4+ HCCs | 01/29 | 01/29 | HEALTHSCAPE USER | 01/29 |
| MEMBER OUTREACH - MEMBERS WITH 4+ HCCs | 01/29 | 01/29 | HEALTHSCAPE USER | 01/29 |
| MEMBER OUTREACH - MEMBERS WITH 4+ HCCs | 01/29 | 01/29 | HEALTHSCAPE USER | 01/29 |
| HSA TEST 2 | 02/10 | 02/10 | HEALTHSCAPE USER | 02/10 |

CAMPAIGN DETAIL

INTERVENTIONS TARGETED    TOTAL RISK TARGETED

DESCRIPTIVE STATISTICS

| DESCRIPTION | STATISTICS |
|---|---|
| 1. NUMBER OF INTERVENTIONS CREATED | ## |
| 2. INTERVENTIONS COMPLETED | ## |
| 3. INTERVENTIONS IN PROGRESS | ## |
| 4. INTERVENTIONS NOT STARTED | ## |

FIG. 13

CREATE A CAMPAIGN

① CAMPAIGN INFO — 1332

CAMPAIGN NAME

START DATE 9/12 2:35 PM    END DATE 9/13 2:35 PM

CAMPAIGN NOTES

CAMPAIGN OWNER
SELECT CAMPAIGN OWNER ▼

② CAMPAIGN LIST BUILDER — 1334

CLONE EXISTING CAMPAIGN ☐
CAMPAIGN TYPE
SELECT CAMPAIGN TYPE ▼

SOURCE REPORT
SELECT CAMPAIGN REPORT... ▼
[VIEW LIST]

③ CAMPAIGN WORKFLOW — 1336

| STEP TASK(S) | USER(S) | WORKGROUP NAME | NOTIFICATIONS | WORKGROUP EMAIL ADDRESS | PREDECESSOR |
|---|---|---|---|---|---|
| 1 | | | WORKGROUP ○ USERS ○ | | NONE |
| 2 | | | WORKGROUP ○ USERS ○ | | NONE ▼ |
| 3 | | | WORKGROUP ○ USERS ○ | | NONE ▼ |
| 4 | | | WORKGROUP ○ | | NONE ▼ |

(1330)

CAMPAIGN ACTIVITY

WORK GROUP(S)

WORK GROUP MEMBER CALLS
CAMPAIGN / 1ST CAMPAIGN
PERCENT COMPLETED [0%]

WORK GROUP MEMBER OUTREACH - MEMBERS WITH 4+ HCCs
CAMPAIGN : MEMBER OUTREACH - MEMBERS WITH 4+ HCC
TOTAL INTERVENTIONS: 0
PERCENT COMPLETED [0%]

WORK GROUP MEMBER OUTREACH - MEMBERS WITH 4+ HCCs
CAMPAIGN : MEMBER OUTREACH - MEMBERS WITH 4+ HCC
PERCENT COMPLETED [0%]

WORK GROUP MEMBER OUTREACH - MEMBERS WITH 4+ HCCs
CAMPAIGN : MEMBER OUTREACH - MEMBERS WITH 4+ HCC
TOTAL INTERVENTIONS: 52
PERCENT COMPLETED [0%]

---

TEST CAMPAIGN
FROM 04/01 THROUGH 04/30
OWNER HEALTHSCAPE USER

UNASSIGNED LIST

☐ ASSIGN SELECTED ITEMS

| MEMBER ID ▼ | LOB ▼ | METAL LEVEL ▼ | AGE | GAP RISK SCORE ▼ | CAPTURED HCCs ▼ | SUSPECT HCCs ▼ | RISK SCORE ▼ | POTENTIAL RISK SCORE ▼ | SPECIFIED RISK GAP |
|---|---|---|---|---|---|---|---|---|---|
| 73 | INDIVIDUAL | SILVER | 57 | 0.50 | 2 | 1 | 30.6 | 14.376 | 24.376 |
| 532 | INDIVIDUAL | SILVER | 44 | 6.704 | 5 | 2 | 16.687 | 15.527 | 25.2650 |
| 692 | INDIVIDUAL | SILVER | 55 | 0.726 | 0 | 4 | 0 | 13.272 | 26.2639 |
| 747 | INDIVIDUAL | SILVER | 44 | 0.704 | 1 | 4 | 13.19 | 13.56 | 13.8627 |
| 775 | INDIVIDUAL | SILVER | 54 | 0.756 | 2 | 2 | 0 | 25.28 | 21.3702 |
| 864 | INDIVIDUAL | SILVER | 42 | 0.554 | 5 | 1 | 0 | 17.491 | 28.8366 |

*FIG. 14*

SYSTEMS AND METHODS FOR PROVIDING INSURER RISK DATA

BACKGROUND

Field

Embodiments provided herein generally relate to systems and methods for providing insurer risk data, and particularly to providing information associated with determining risks that an insurer has taken that are to be compensated through a predetermined program.

Technical Background

Beginning in 2014 under the Affordable Care Act (ACA), the health insurance industry shifted from the traditional underwritten insurance model to one that is community-rated and guaranteed issue. This means that all enrollees must be accepted and pricing may not vary based on health status. Under the ACA model, various government programs were implemented. As an example, a risk adjustment program was implemented that transfers payments and charges between health insurance carriers within a risk pool based on the relative riskiness of a population. This program was intended to dampen the effects of adverse selection in the community-rated, guaranteed issue markets. As an example, because insurers were no longer allowed to deny coverage or charge increased rates for many preexisting conditions, the risk adjustment program reimburses those insurers who accept individuals (or groups) that are deemed to be "riskier." The reimbursements are derived from the insurers who do not take the "riskier" individuals or groups, so that insurers who do not accept riskier clients will not receive a windfall.

Additionally, another program that was implemented was a reinsurance program. The reinsurance program was a three-year transitional program in which the federal government covers a part of the claims expense for high cost members within the individual market. By the government compensating insurers for high cost/risk members, the down-side risks for insurers and the incentive for overly conservative pricing are both reduced under the ACA.

While these new programs provide options for insurers to accept riskier members, many of these insurers do not know the cost-benefit for accepting various members. Additionally, current solutions are not able to provide an accounting of costs, income, and/or other financial data that would allow for an efficient operation under the ACA.

SUMMARY

In one embodiment, a method may include receiving insurance data related to an insurer and determining a captured risk score from the insurance data. The captured risk score may be determined by a predetermined calculation and may be related to a risk taken by the insurer for insuring a first patient that qualifies as a high risk patient, based on first criteria, where the insurer is qualified for compensation for insuring the first patient, based on the captured risk score. Some embodiments of the method include determining a gap risk score from the insurance data, where the gap risk score is determined from a proprietary calculation that is different than the predetermined calculation, and where the gap risk score identifies a second criteria that was not identified in the captured risk score and the qualifies the insurer for an additional compensation. In some embodiments, the method includes providing a user interface that includes data related to the captured risk score and the gap risk score.

In another embodiment, system may include a processor and a memory component that is coupled to the processor. The memory component may store logic that, when executed by the processor, causes the system to receive insurance data related to an insurer, where the insurance data including information related to coverage provided by the insurer and determine a captured risk score from the insurance data. The captured risk score may be determined by a predetermined calculation and may be related to a risk taken by the insurer for insuring a first patient that qualifies as a high risk patient, based on first criteria, where the insurer is to be compensated for insuring the first patient, based on the captured risk score. In some embodiments, the logic causes the system to determine a gap risk score from the insurance data, where the gap risk score may be determined from a proprietary calculation that is different than the predetermined calculation, and where the gap risk score identifying a second criteria that was not identified in the captured risk score and the qualifies the insurer for an additional compensation. In some embodiments, the logic causes the system to provide a user interface that includes data related to the captured risk score and the gap risk score.

In yet another embodiment, a non-transitory computer-readable medium may include logic that, when executed by a computing device, causes the computing device to receive insurance data related to an insurer, where the insurance data includes information related to coverage provided by the insurer and determine a captured risk score from the insurance data. The captured risk score may be determined by a predetermined calculation and may be related to a risk taken by the insurer for insuring a first patient that qualifies as a high risk patient based on first criteria, where the insurer is to be compensated for insuring the first patient, based on the captured risk score. In some embodiments, the logic causes the computing device to determine a gap risk score from the insurance data, where the gap risk score may be determined from a proprietary calculation that is different than the predetermined calculation, and may identify a second criteria that was not identified in the captured risk score and the qualifies the insurer for an additional compensation. In some embodiments, the logic causes the computing device to provide a user interface that includes data related to the captured risk score and the gap risk score.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 depicts a user interface that provides member profile information, according to one or more embodiments shown and described herein;

FIG. 9 depicts a user interface that provides lost risk members, according to one or more embodiments shown and described herein;

FIG. 10 depicts a user interface that provides one or more providers with a gap risk, according to one or more embodiments shown and described herein;

FIG. 12 depicts a user interface that provides details of an active campaign, according to one or more embodiments shown and described herein;

FIG. 13 depicts a user interface that provides one or more options for creating a new campaign, according to one or more embodiments shown and described herein;

FIG. 14 depicts a user interface that provides data related to campaign activity, according to one or more embodiments shown and described herein;

DETAILED DESCRIPTION

In addition to the ACA-related programs, embodiments disclosed herein may be configured to employ other risk adjustment models, including a Medicare advantage risk adjustment model, and/or may be used to analyze health insurance carrier data in general, such as for large employers and/or other persons or entities. Embodiments may also be configured to provide health insurance carriers (insurers) with analytical and reporting capabilities based on the regulatory and market environment. These capabilities allow the carriers to utilize analytics to drive internal operations and optimize efforts aimed at obtaining the appropriate, full payments from both risk adjustment and reinsurance programs in a cross-functional manner.

As an example, embodiments described herein may be configured to determine a gap risk score that identifies the risk taken by a carrier with respect to an actual or estimated risk that similar carriers are taking This may then be used to identify compensation that may be made from or to the carrier based on that risk. Other analytics and analysis may also be provided as described in more detail below.

Figure 1:
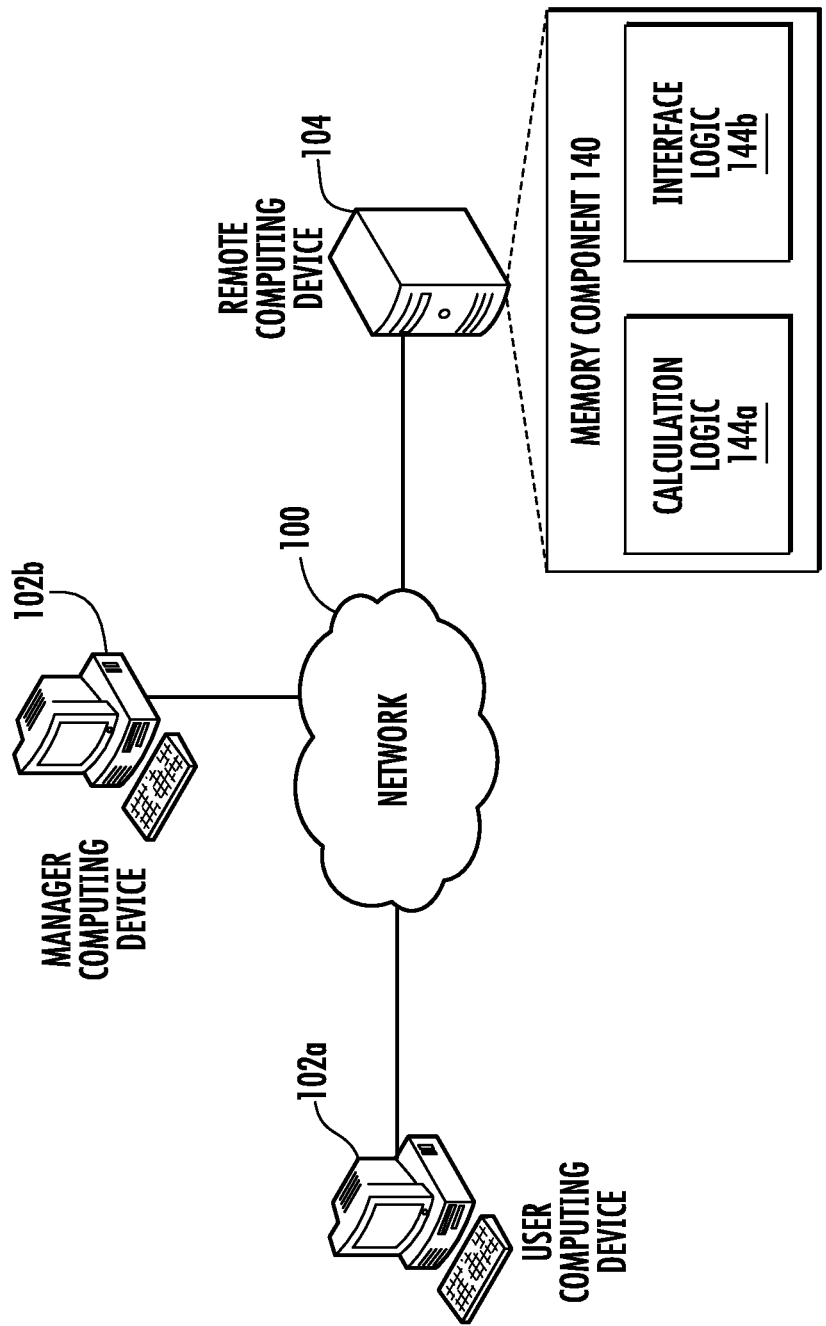
FIG. 1 depicts a computing environment for providing insurer risk data, according to one or more embodiments shown and described herein.

Referring now to the drawings, FIG. 1 depicts a computing environment for providing insurer risk data, according to one or more embodiments shown and described herein. As illustrated, the computing environment may include a network 100, which may include a wide area network (wired or wireless), such as the internet, a cellular network, or other communications network for communicating devices across a wide area. Additionally, the network 100 may include a wired or wireless local area network for communicating data, as described herein.

Coupled to the network 100 is a computing device, such as a user computing device 102a. The user computing device 102a may be configured for users, such as insurance carriers, medical providers, etc., to view data associated with members of that the carriers insure. As discussed in more detail below, the user computing device 102a may additionally interface with a remote computing device 104 to receive criteria associated with the strategy and/or or project.

Also included is a manager computing device 102b, which is also coupled to the network 100. The manager computing device 102b may be operated by a manager and thus may be given different access to the remote computing device 104. It should be understood that since, in some embodiments, the solutions described herein may be embodied as a web service and thus may utilize any desktop and/or mobile device as a user computing device 102a and/or a manager computing device 102b. Accordingly, in these embodiments different login classifications may be grated for general users and managers. Depending on the embodiment, additional access levels may also be granted.

The remote computing device 104 may include a memory component 140 that stores calculation logic 144a and interface logic 144b. The calculation logic 144a may include one or more components, such as for receiving data associated with an insurance carrier's coverage and utilize the received data to determine risk gaps and other information associated with compliance with the ACA (or other similar regulation, statute, and/or program). The interface logic 144b may be configured to cause the remote computing device 104 to provide the user interfaces and/or otherwise facilitate the workflow, as provided by the user computing device 102a and/or the manager computing device 102b.

Figure 2:
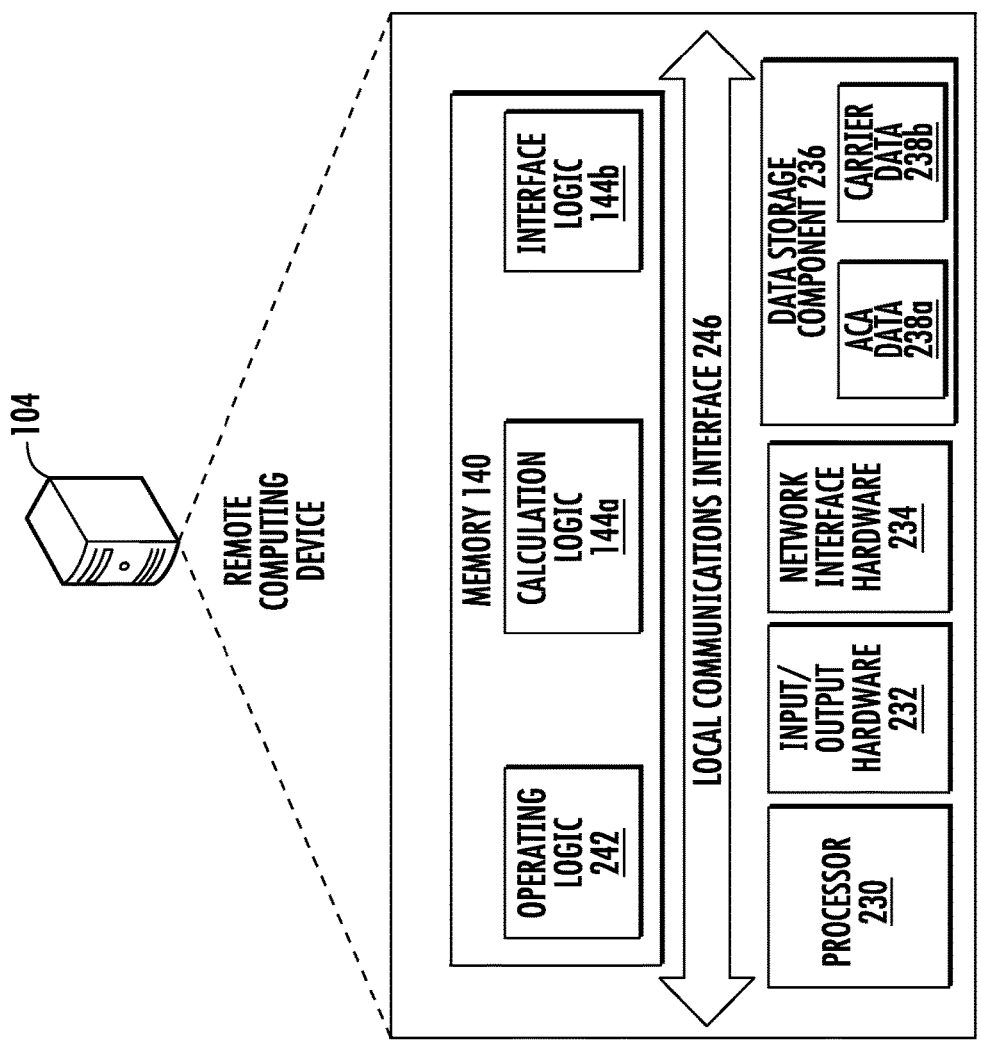
FIG. 2 depicts a remote computing device for providing insurer risk data, according to one or more embodiments shown and described herein.

FIG. 2 depicts a remote computing device 104 for providing insurer risk data, according to one or more embodiments shown and described herein. As illustrated, the remote computing device 104 includes a processor 230, input/output hardware 232, a network interface hardware 234, a data storage component 236 (which stores ACA data 238a, carrier data 238b, and/or other data such as proprietary mappings, data translation, etc.), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. Depending on the particular embodiment, these non-transitory computer-readable mediums may reside within the remote computing device 104 and/or external to the remote computing device 104.

The memory component 140 may store operating logic 242, the calculation logic 144a, and the interface logic 144b. Each of these logic components may include a plurality of different pieces of logic, each of which may be embodied as a computer program, firmware, and/or hardware, as an example. A local interface 246 is also included in FIG. 2 and may be implemented as a bus or other communication interface to facilitate communication among the components of the remote computing device 104.

The processor 230 may include any processing component operable to receive and execute instructions (such as from a data storage component 236 and/or the memory component 140). As described above, the input/output hardware 232 may include and/or be configured to interface with the components of FIG. 2.

The network interface hardware 234 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the remote computing device 104 and other computing devices.

The operating logic 242 may include an operating system and/or other software for managing components of the remote computing device 104. As discussed above, the calculation logic 144a may reside in the memory component 140 and may be configured to cause the processor 230 to receive information related to an insurer and calculate risk gaps and other statistical data from that data. The interface logic 144b may be configured to cause the processor 230 to provide user interfaces and/or otherwise facilitate workflow as described herein.

It should be understood that while the components in FIG. 2 are illustrated as residing within the remote computing device 104, this is merely an example. In some embodiments, one or more of the components may reside external to the remote computing device 104 or within other devices, such as those depicted in FIG. 1. It should also be understood that, while the remote computing device 104 is illustrated as a single device, this is also merely an example. In some embodiments, the calculation logic 144a and the interface logic 144b may reside on different computing devices. As an example, one or more of the functionalities and/or components described herein may be provided by the user computing device 102 and/or the remote computing device 104.

Additionally, while the remote computing device 104 is illustrated with the calculation logic 144a and the interface logic 144b as separate logical components, this is also an example. In some embodiments, a single piece of logic may provide the described functionality. It should also be understood that while the calculation logic 144a and the interface logic 144b are described herein as the logical components, this is also an example. Other components may also be included, depending on the embodiment.

As will become apparent through the description related to the drawings below, embodiments described herein may be configured to utilize data provided by a carrier that mirrors the data layout that is provided by the carrier to the Department of Health and Human Services (HHS) for the risk adjustment and reinsurance programs with additional data elements to enhance the analytics performed. Accordingly, the following types of data may be provided: enrollment data, medical claims data, pharmacy claims data, provider data, and/or health insurance policy/plan information. Additional data that may be provided to enhance the analytics performed may include consumer segmentation data, enrollee demographic data (e.g., income, employer, etc.), health risk assessment data (i.e., self-reported health status), and/or other sources of medical information (e.g., lab data, medical record data, etc.).

Once the data is loaded and transformed into predetermined layouts, one or more data validation processes may be performed to provide reasonable assurance that the data is accurate, complete, and of overall high quality. To this end, logical checks, referential checks, checks related to descriptive statistics for validation with the carrier may be performed.

Upon completion of the data validation process, embodiments described herein may share the results with the carrier or other user to validate the results prior to moving forward. Once the data is validated by the user, the data may then be loaded into a data warehouse for the carrier and may be transformed into standard values and formats for processing. As part of this process, the data may also be transformed to account for any data errors and anomalies that may impact the process. As an example, member enrollment data may be cleaned up so that a member (or a plurality of members) is only enrolled in one policy at a time, etc.

The next phase of the process is to run the carrier's data through a dynamic risk scoring engine, which may be part of the calculation logic 144a and analyzes medical claims and health insurance enrollment data to identify risk-adjusted conditions that a member of the carrier has received a diagnosis code for during the time period analyzed. Members are then assigned a total risk score for their conditions, as well as a demographic risk score based on their age, gender, and policy selected. This ultimately results in a captured risk score for the insurance carrier. The captured risk score may represent the risk that has been documented and for which the carrier will receive credit under the risk adjustment program of the ACA.

Additionally, embodiments described herein may be configured to provide the ability to score any period of time by adjusting parameters within the process, the ability to adjust time intervals (e.g., segment monthly, quarterly, yearly, etc.), the ability to adjust time bounds (e.g., score the current year, prior year, trailing 12 months, multi-year, etc.), the ability to track aggregate and member-level economic consequence (such as risk scores, etc.) over time, etc. Similarly, embodiments disclosed herein may be configured to modify the inputs of the scoring process to develop various scenarios and analyses, analyze claims not included in the standard HHS models, identify the claims and diagnosis codes resulting in the risk adjusted condition for supporting detail, and/or identify the physician(s) that coded the diagnosis code(s) resulting in the risk adjusted condition. Similarly, some embodiments are configured to score members on a normalized basis by removing the impact of enrollment and policy information on risk score. This includes turning on and/or off the various components of the risk score calculation to develop various analytical scenarios. Some embodiments may be configured to score non-risk adjusted market segments. As an example, some embodiments may be configured to score large group, administrative services only, and other segments that are not risk adjusted for analytical purposes.

Upon completion of the scoring process, which identifies and quantifies the captured risk that has been documented per HHS guidelines, the candidate data is then run through the a risk gap identification process, which may embodied in the calculation logic 144a to identify the carrier's risk gaps. The risk gaps may include risk that has not been documented and the carrier has not received credit, but has been identified by embodiments disclosed herein. Accordingly, the calculation logic 144a may include a persistency check algorithm to identify chronic conditions that were captured in previous years that have not been captured in the current year.

A pharmacy claims review algorithm may be included in the calculation logic 144a to identify members utilizing drugs that are correlated to a risk adjusted condition that have not been captured in the current year. A non-scored claims review algorithm may be included in the calculation logic 144a to identify diagnosis codes for risk adjusted conditions that are on claims that are excluded from the HHS risk adjustment model, as well as identify diagnosis codes for risk adjusted conditions that are on claims that were incurred in the current year but were incurred while the member was enrolled in a non-risk adjusted policy. An unspecified diagnosis code algorithm may be part of the calculation logic 144a and may identify members with a diagnosis code that is not related to a risk adjusted condition, however is related to a more specific or higher severity diagnosis code that is risk adjusted.

A mother-infant bundling algorithm may be included with the calculation logic 144a to identify infant diagnosis codes submitted to a mother's policy and identification of pregnancy diagnosis codes submitted to an infant's policy. An infant neonatal intensive care unit (NICU) claims review algorithm may also be included with the calculation logic 144a and may identify infants with NICU claims that were assigned a risk score associated with a healthy infant and/or high cost, low risk infants that were assigned a risk score associated for a healthy infant.

The calculation logic 144a may include methodologies to probability-adjust and aggregate the risk gaps and their resultant risk scores are utilized to develop an aggregate member risk gap and target risk score. Factors that are included in the probability-adjustment calculation may include, the condition indicated, the source(s) of the indication (and number of sources), the frequency of the indication, the time interval the indication occurred and/or other features.

Embodiments described herein may also identify the supporting claims detail to provide users with the clinical information required to validate the risk gaps. This includes, but is not limited to, claim IDs, relevant dates of service, diagnosis codes, procedure codes, revenue codes, pharmaceutical substances, etc. Beyond the initial risk gap identification process, embodiments described herein provide carriers with a workflow management capability that provides carriers with the ability to create workflows to support risk gap closure through tactics. The data captured through the workflow management tool is processed through analytical engine portion of the calculation logic 144a as part of a feedback loop to further refine the predictive capabilities of risk gap targeting algorithms. This includes, but is not limited to refinement of probability adjustment factors, reprioritization of indicators based on risk gap closure success and/or likelihood of natural close, identification of indicators leading to false positives, and/or data mining to identify new/additional indicators for risk gap identification purposes.

After calculating the captured risk score, risk gap, and target risk score for at least one member, one or more of the following may be calculated: reinsurance receivables, risk adjustment transfer payments, economic value calculation, and value of individual conditions. Calculating reinsurance receivables includes calculating an annual plan liability for at least one member in the individual market and then a HHS formula is utilized for calculating reinsurance receivables to calculate a member level receivable. Calculating risk adjustment transfer payments includes analyzing one or more members through an HHS transfer payment formula (depending on the risk adjustment model utilized) to calculate a member level transfer payment based on captured risk and target risk. Calculating economic value includes calculating a member-level economic consequence, which is a measure of each member's net value after any transfer payments and reinsurance receivables (scenario modeling allows for one or both of the payments/charges to be included or excluded—i.e., a pre/post-risk adjusted economic value, and a pre/post-reinsurance economic value); economic value is also calculated based on both captured risk and target risk. Calculating the value of individual conditions includes calculating the value of an individual condition to allow users to prioritize risk gaps for risk optimization tactics.

One component to the transfer payment and economic value calculation is the assumption made for the overall market or risk pool. Embodiments described herein provide clients with the ability to provide market assumptions (e.g., absolute or relative market risk, market share, risk gap closure for client and competitors, etc.) that are then loaded into the solution to develop various scenarios. Similarly, embodiments may be configured to maintain extensive provider attribution mapping capabilities that associate members with one or multiple providers. Embodiments provide users with the ability to view results based on multiple provider attribution models, including client-developed models and proprietary models. Accordingly, embodiments may provide a single provider model that maps a member to the physician with the most visits (such as evaluation & management (E&M) visits) over a predetermined period (e.g., 18 months). A single provider (primary care) model may be provided that maps a member to the primary care physician with the most visits over the predetermined period (e.g., 18-months). Similarly, a single provider (specialist) model may be provided that maps a member to the specialist with the most visits over a predetermined period (e.g., 18-months).

The provider attribution results are then utilized to attribute captured risk and risk gaps to a physician under various scenarios, such as under each model. The different scenarios can then be viewed through a web interface or in the data warehouse. Analytics may then be performed related to providers' performance and their attributed members. These analytics include measuring the providers' performance in diagnostic coding, identifying specific potential gaps related to the providers attributed members that the provider should close and tracks the providers' performance in gap closure interventions. In addition, embodiments may perform comprehensive analytics, measurement, and reporting of a provider's financial performance and impact to the insurance carrier within the risk adjusted markets related to their attributed members and related to products that are built around the provider's integrated system.

Embodiments may also be configured to offer clients extensive workflow management capabilities through the ability to create workflows aimed at targeting and prioritizing risk gaps at both the member and provider level. In addition, embodiments may be configured to maintain analytical capabilities around tracking and monitoring the progress of various risk gap closure tactics in order to measure the effectiveness and return on investment (ROI) of each tactic, as well as at the aggregate level. This infrastructure allows for this capability to be utilized using a manager portal (e.g. through the manager computing device 102b), as well as through third-party solutions (such as through a third party computing device connected to the network 100). For both HCC manager and third-party solutions, the prioritized work list may be sent to the workflow solution where the risk gap status and disposition are tracked and reported. The results of the risk gap closure tactic or activity are then sent back to the remote computing device 104, where the results are compared against the client medical claims data to confirm risk gap closure. Based on these transactions, the final risk gap disposition, tactic effectiveness and ROI metrics are then pushed back to the workflow solution.

Once at least a portion of the previously mentioned processes are completed, the results are then loaded into each client's data mart. The data mart update processes aggregate the results to various levels of detail, based on the functional requirements of different types of users (e.g., company-level information for executive level tracking and monitoring, claim level detail for sharing with clinical staff and providers, member level detail to support outreach efforts, etc.). Clients are provided access to the data mart through either a web-based interface and/or by providing clients with access to the data through various platforms (e.g., flat file extracts, web services, etc.). In addition to being used as a data sharing and analysis platform, the data mart is utilized to store client data for archival and retrieval purposes.

Referring again to the drawings, FIGS. 3-10 depict user interfaces for a hierarchical condition category (HCC) sentinel. These user interfaces provide the ability to understand risk profiles (both captured and gap) and identify providers and members for intervention to close risk gaps. Some of the features of these user interfaces include executive and summary level views aimed at identifying cohorts of members (based on demographic information and diagnostic/health status results), as well as cohorts of providers for focus, as well as detailed views to support intervention activities, such as those depicted in FIGS. 3-6.

Figure 3:
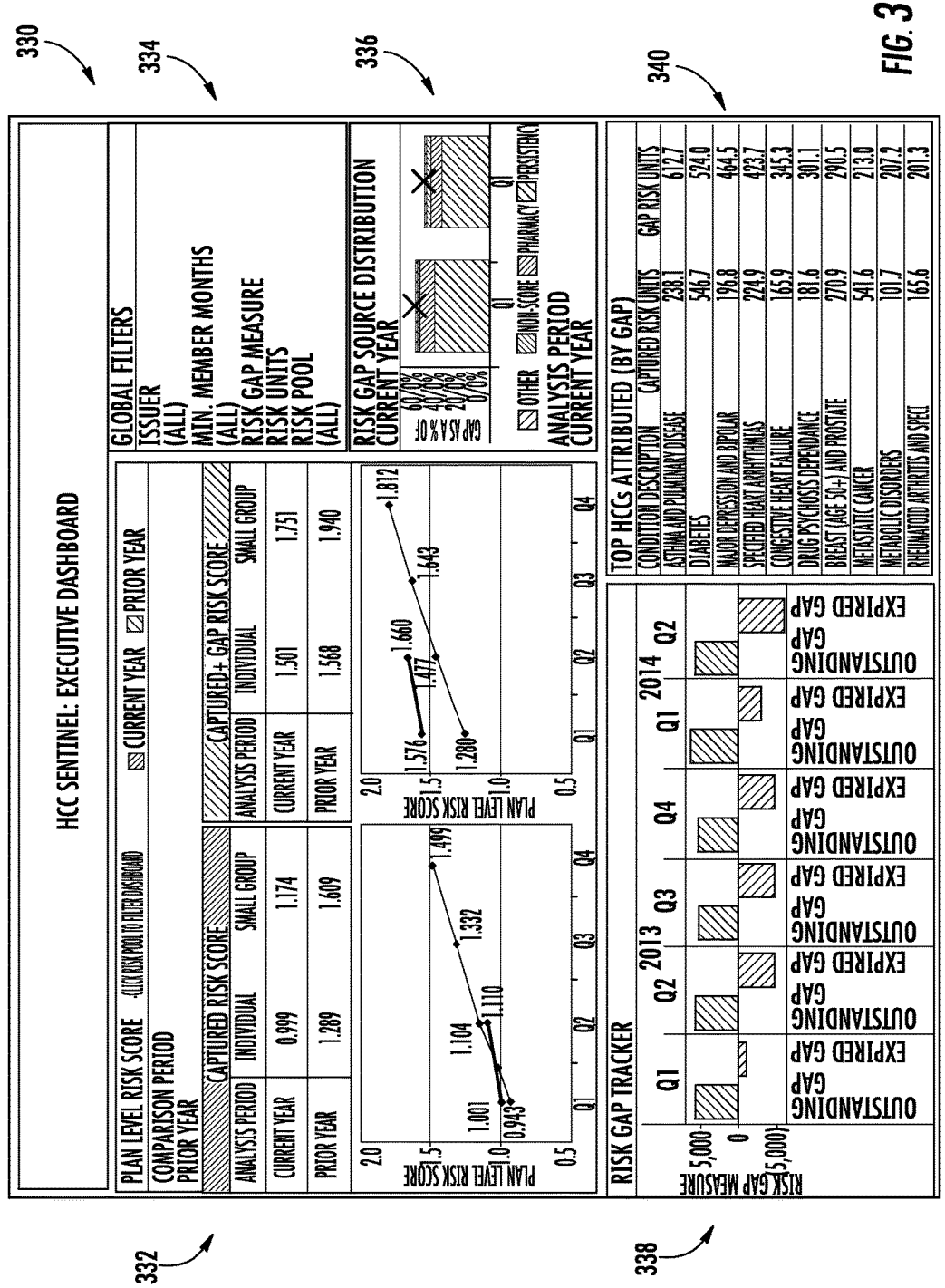
FIG. 3 depicts a user interface that may be provided to a user for providing risk data related to an insurer, according to one or more embodiments shown and described herein.

Accordingly, FIG. 3 depicts a user interface 330 that may be provided to a user for providing risk data related to an insurer, according to one or more embodiments shown and described herein. As illustrated, the user interface 330 includes an executive dashboard that includes a risk level score section 332 that provides a captured risk score and a capture risk score plus a gap risk score for a particular carrier. Specifically, a captured risk score may be identified to determine a compensation that the insurer qualifies for insuring a first patient (or patients) that qualifies as a high risk patient and thus may be calculated for a particular period and may be segmented for individual members, groups of members, individual claims, and/or other levels of granularity. Regardless, the captured risk score may represent a score that the carrier may qualify for compensation according to a risk adjustment program or other program. The captured risk score may be shown for identifying a level of reimbursement or disbursement that a carrier may expect to receive.

Similarly, the captured risk score plus the gap risk score chart may analyze similar members and periods, but may take into account a gap of the risk score that was captured via the traditional approach to capturing a risk score, plus gap in the risk calculation that have been identified by embodiments described herein. The gap risk score may identify additional compensation that the insurer is qualified for receiving for insuring a second patient (or patients). Accordingly, a carrier is provided with information to identify a mechanism for accurately reporting a risk score to maximize reimbursement and/or minimize disbursement.

Also included in the user interface 330 is a filters section 334 which provides options for filtering the data provided in the user interface 330. As an example the user may filter by insurer, time, risk gap measure, risk pool, and others. A risk gap source distribution section 336 may also be provided, which may identify the risk gaps that the carrier has experienced, based on medical claims over a given period. As an example, pharmacy, persistency, non-scored, and/or other sources of gap. Additionally, a risk gap tracker section 338 is included and provides outstanding risk gap and expired risk gap for various timer periods. An attributed HCC section 340 is also included and provides captured risk units and gap risk units for one or more types of medical conditions.

Figure 4:
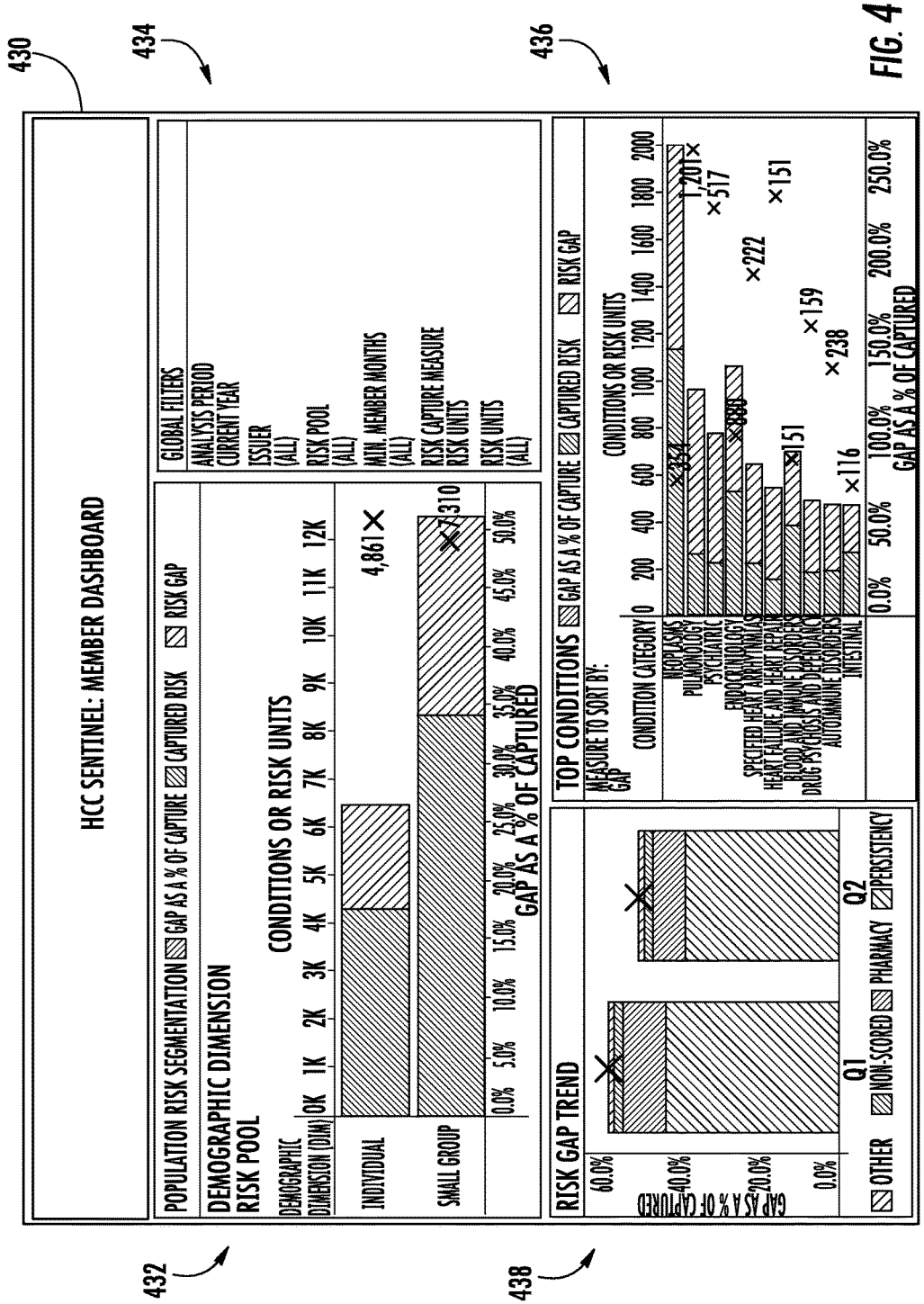
FIG. 4 depicts a user interface that provides population risk segmentation data, according to one or more embodiments shown and described herein.

FIG. 4 depicts a user interface 430 that provides population risk segmentation data, according to one or more embodiments shown and described herein. As illustrated, the user interface 430 includes a population risk segmentation section 432, which provides a demographic segmentation for insurance carriers' members. The population risk segmentation section 432 therefore differentiates among captured risk, risk gap, and gap as a percentage of captured risk. A filters section 434 is also provided and may include filtering options similar to those described with regard to FIG. 3. A risk gap trend section 438 is included and may provide gap as a percentage of captured risk. Additionally, differentiations among gap source are also provided. A top conditions section 436 is also provided. The top conditions section 436 provides one or more medical conditions, as well as captured risk, risk gap, and/or gap as a percentage of captured risk.

Figure 5:
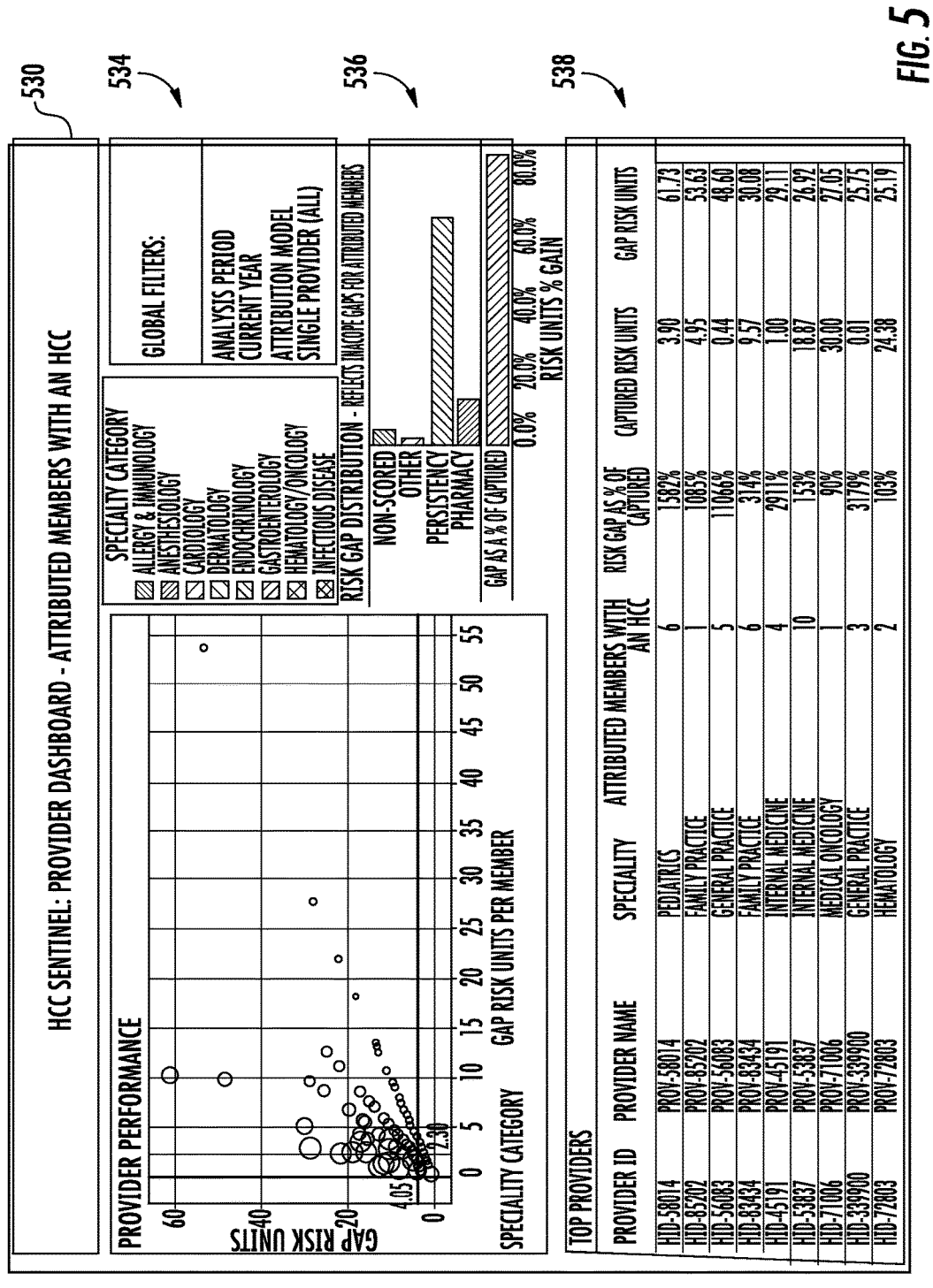
FIG. 5 depicts a user interface that provides provider performance data, according to one or more embodiments shown and described herein.

FIG. 5 depicts a user interface 530 that provides a medical provider performance statistic, according to one or more embodiments shown and described herein. As illustrated, the user interface 530 provides a provider performance section 532, a filters section 534, a risk gap distribution section 536, and a top providers section 538. The provider performance section 532 may depict one or more plots of gap risk units versus gap risk units per member. These data points may be differentiated by specialty category among a plurality of predetermined medical specialties, such as allergy and immunology, anesthesiology, cardiology, dermatology, endocrinology, gastroenterology, hematology and oncology, infectious disease, etc. The filters section 534 may provide filters, such as those described above, and/or may provide a period filter, attribution model filter, and/or other filters. The risk gap distribution section 536 may provide gaps for attributed members, based on source. The top providers section 538 may provide a list of providers, as well as specialties, attributed members with an HCC, risk gap as a percentage of captured risk, captured risk units, and gap risk units.

Figure 6:
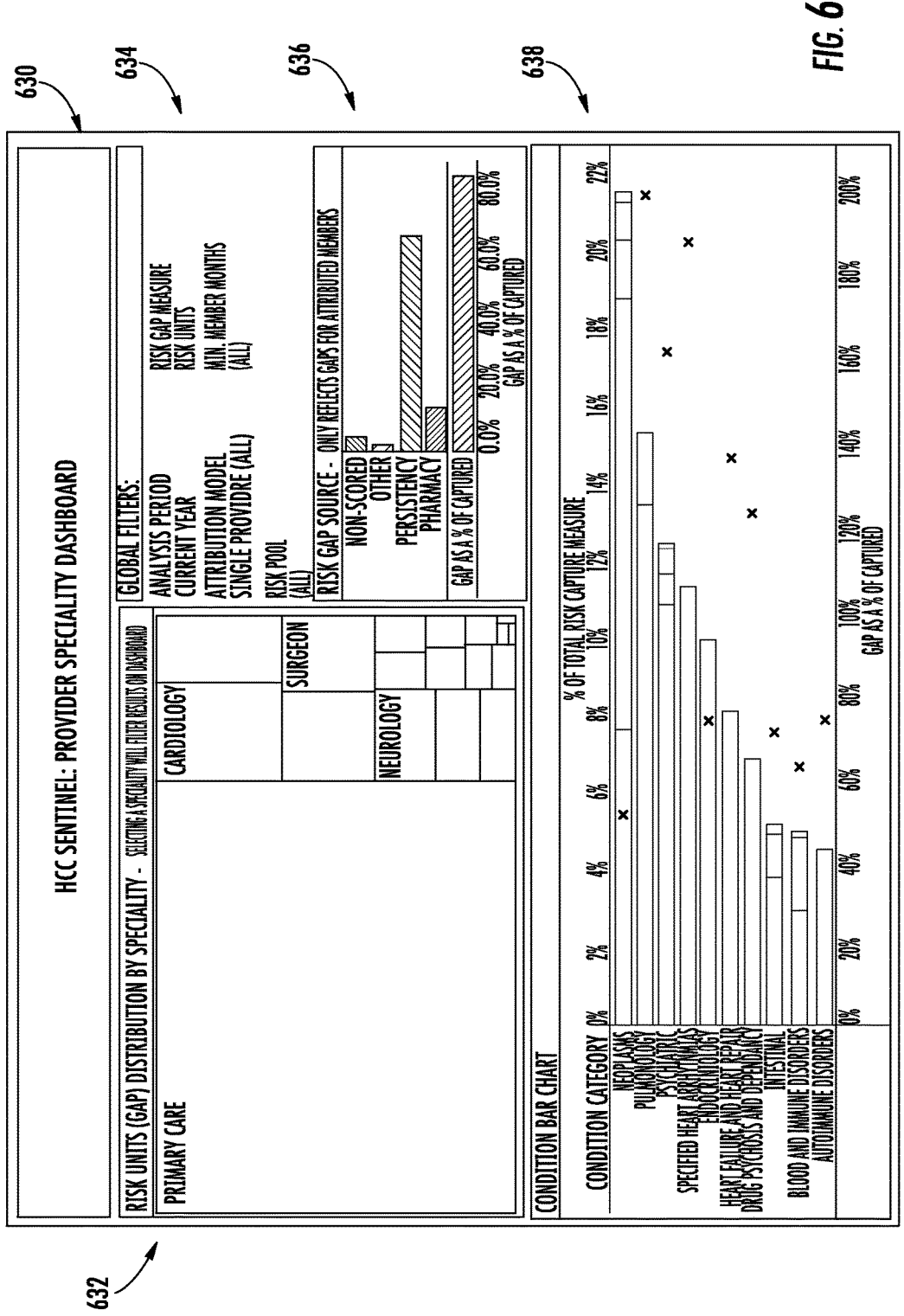
FIG. 6 depicts a user interface that provides risk gap units, according to one or more embodiments shown and described herein.

FIG. 6 depicts a user interface 630 that provides risk gap units, according to one or more embodiments shown and described herein. As illustrated, the user interface 630 includes a risk units section 632, a filters section 634, a risk gap source section 636, and a condition section 638. The risk units section 632 provides a visually coded (such as color coded) representation of the risk gap distribution. Accordingly, the risk units section 632 may use size of a depicted specialty, as well as a color and/or shading to identify the specialties that have the largest risk and/or risk gap. Additionally, if a user selects a specialty, results may be filtered to provide additional details on the risk gap of that specialty.

The filters section 634 may provide one or more options for filtering the results manually, as described above. The risk gap source section 636 may provide gaps for attributed members, based on source. The results may be provided as a percentage of captured risk. Additionally, the condition section 638 may provide one or more condition categories and the total percentage of gap risk as a percentage of captured risk.

Figure 7:
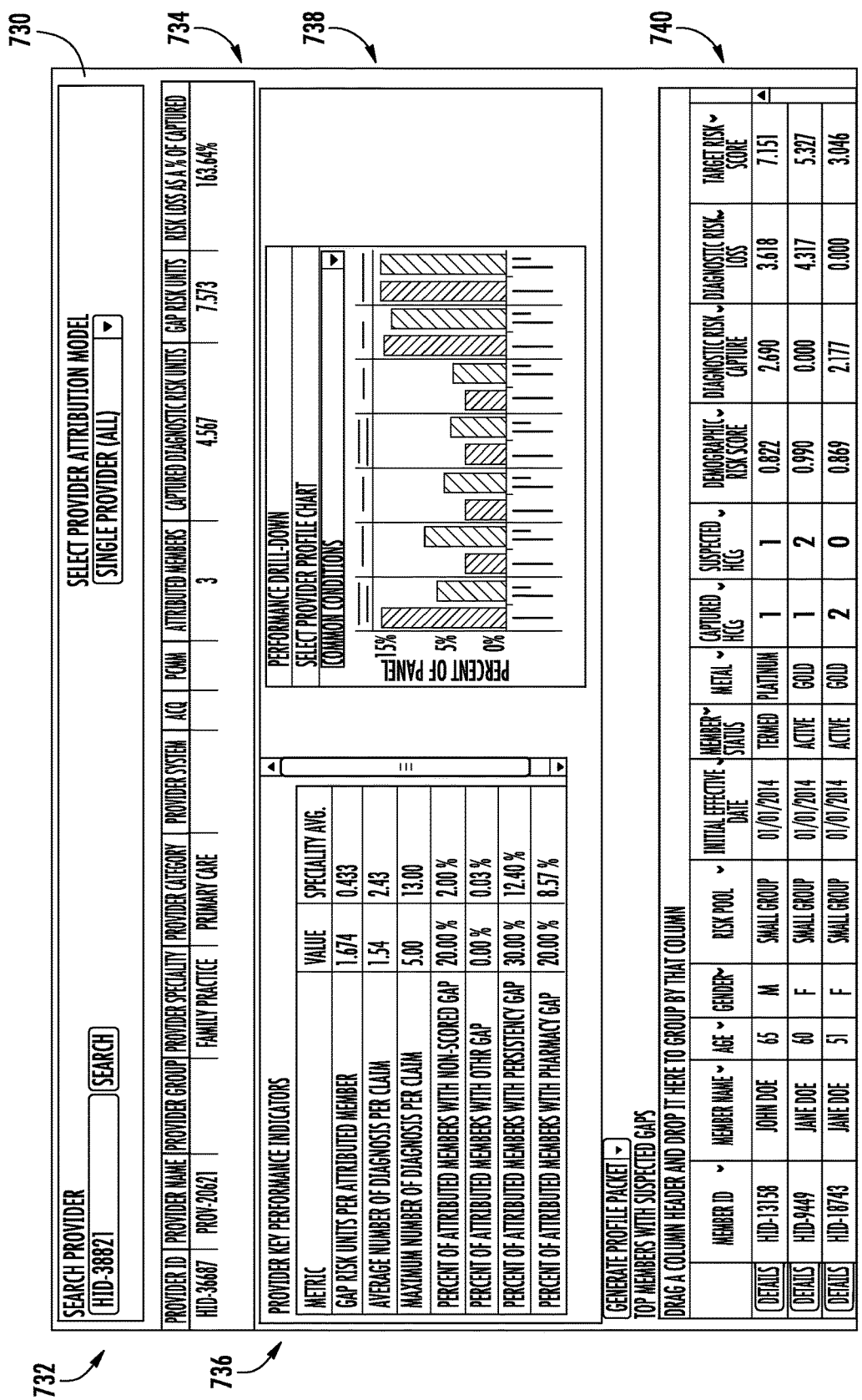
FIG. 7 depicts a user interface that provides provider performance indicators, according to one or more embodiments shown and described herein.

FIG. 7 depicts a user interface 730 that provides a medical provider performance statistic, according to one or more embodiments shown and described herein. As illustrated, the HCC sentinel includes provider profile data that includes a portable provider profile and provides summary level information and statistics on a provider, key performance indicators to compare performance against peers, and member level details on captured risk and risk gaps (with the ability to drill down to a member profile). Specially, the user interface 730 includes a search section 732, a provider details section 734, a performance indicators section 736, a performance drill-down section 738, and a top members section 740. The search section 732 may include a provider search option, as well as a provider attribution model option. The provider search option may be configured to allow the user to search for a specific physician. The provider attribution model option provides the user with the ability to select a model for which data may be displayed. As an example, a single provider, a plurality of providers, and/or other options may be provided.

The provider details section 734 may provide a provider identifier, a provider name, a provider group, a provider specialty, a specialty category, a provider system, an accountable care organization category, a patient centered medical home category, an attributed members category, a captured diagnostic risk units category, a gap risk units category, and a risk loss as a percentage of captured loss category.

The performance indicators section 736 may provide a plurality of metrics that affect gap risk for a particular medical provider, member, or other division. As an example, the metrics may include gap risk units per attributed member, average number of diagnoses per claim, maximum number of diagnoses per claim, a percent of attributed members with non-scored gap, a percent of attributed members with other gap, a percent of attributed members with persistency gap, and a percent of attributed members with pharmacy gap. As will be understood, these and/or other metrics may be applied, depending on the particular embodiment.

Similarly, the performance drill-down section 738 may provide a graphical representation of one or more conditions, as well as a prevalence of that condition as a percent of profile versus a specialty average. Additionally, the top members section 740 may provide a member identifier category, a member name category, an age category, a gender category, a risk pool category, an initial effective date category, a member status category, a metal category, a captured HCCs category, a suspected HCCs category, a demographic risk score category, a diagnostic risk capture category, a diagnostic risk loss category, and a target risk score category. Specifically, the top members section 740 may provide an identification of the members that provide the greatest risk gap, lowest risk gap, and/or other information, depending on the particular embodiment. Depending on the particular embodiment, at least a portion of this data may also be exported.

FIG. 8 depicts a user interface 830 that provides member profile information, according to one or more embodiments shown and described herein. As illustrated, the user interface 830 provides an exportable member profile that provides summary level information and statistics on captured risk and risk gaps, details on both captured conditions and risk gaps, and claim level supporting detail. Specifically, the user interface 830 provides a search section 832, a member information section 834, a captured HCCs section 836, a suspected HCCs section 838, and a recent medical claims section 840. The search section 832 may provide a member search option, as well as a generate option that provides the user with the ability to generate a new member profile. The member information section 834 provides a summary statistic of one or more selected members that includes a member identifier category, a member name category, an initial effective date category, a member status category, an age category, a gender category, a risk pool category, a metal category, a captured HCCs category, a demographic risk score category, a diagnostic risk capture category, a diagnostic risk loss category, and a target risk score category.

Similarly, the captured HCCs section 836 includes an HCC category, an HCC code category, an HCC description category, a first date coded category, a last date coded category, and a risk units category. The suspected HCCs section 838 includes a risk loss category, a risk loss source category, an HCC category, an HCC code category, a first date coded category, a last date coded category, and a risk units category. The recent medical claims section 840 includes an encounter identifier category, an HCC code category, an HCC description category, a first date of service category, a last date of service category, a diagnosis code category, a diagnosis description category, and a national drug code (NDC) category.

FIG. 9 depicts a user interface 930 that provides lost risk members, according to one or more embodiments shown and described herein. As illustrated, the user interface 930 provides a prioritized member chase lists that can be programmed based on client-provided and/or developed parameters and requirements (e.g., list of members for requiring a call to remind them to schedule their annual PCP visit). Specifically, the user interface 930 includes an export section 932 and a lost risk members section 934. The export section 932 provides options to export the provided data to one or more formats. The lost risk members section 934 provides a member identifier category, a member name category, an initial effective date category, a member status category, an age category, a gender category, a risk pool category, a metal level category, a risk adjustment model category, a captured HCCs category, a diagnostic risk capture category, a suspected HCCs category, a diagnostic risk loss category, and a target risk score category.

FIG. 10 depicts a user interface 1030 that provides one or more providers with a gap risk, according to one or more embodiments shown and described herein. As illustrated, the user interface 1030 includes prioritized provider chase lists that can be programmed based on client-provided and/or developed parameters and requirements (e.g., list of providers to contact for chart reviews). Specifically, the user interface 1030 includes an attribution and export section 1032 and a gap risk section 1034. The attribution and export section 1032 includes options for selecting an attribution model, as discussed above. Additionally, the attribution and export section 1032 includes options for exporting the data, as also described above. The providers with gap risk section 1034 includes a provider identifier category, a provider name category, a provider group category, a specialty category, a provider system category, an accountable care organization (ACO) category, a patient centered medical home (PCMH) category, an attributed members category, a captured risk category, a risk gap percentage captured category, a gap risk units category, and a target risk units category.

It should be understood that, while the user interfaces of FIGS. 3-10 relate to an HCC sentinel module, an analytical tool for understanding key drivers of captured risk and risk gaps, FIGS. 11-15 reflect user interfaces for the HCC manager module, a workflow tool for closing risk gaps. Specifically, FIGS. 11-15 provide a workflow and task management capabilities for targeting members and providers for intervention (such as those identified in chase lists), as well as the ability to input additional information obtained, track status, and monitor efficacy and return on investment at an aggregate level; results from an HCC manager are also utilized to refine the prioritization of chase lists through a feedback loop.

Figure 11:
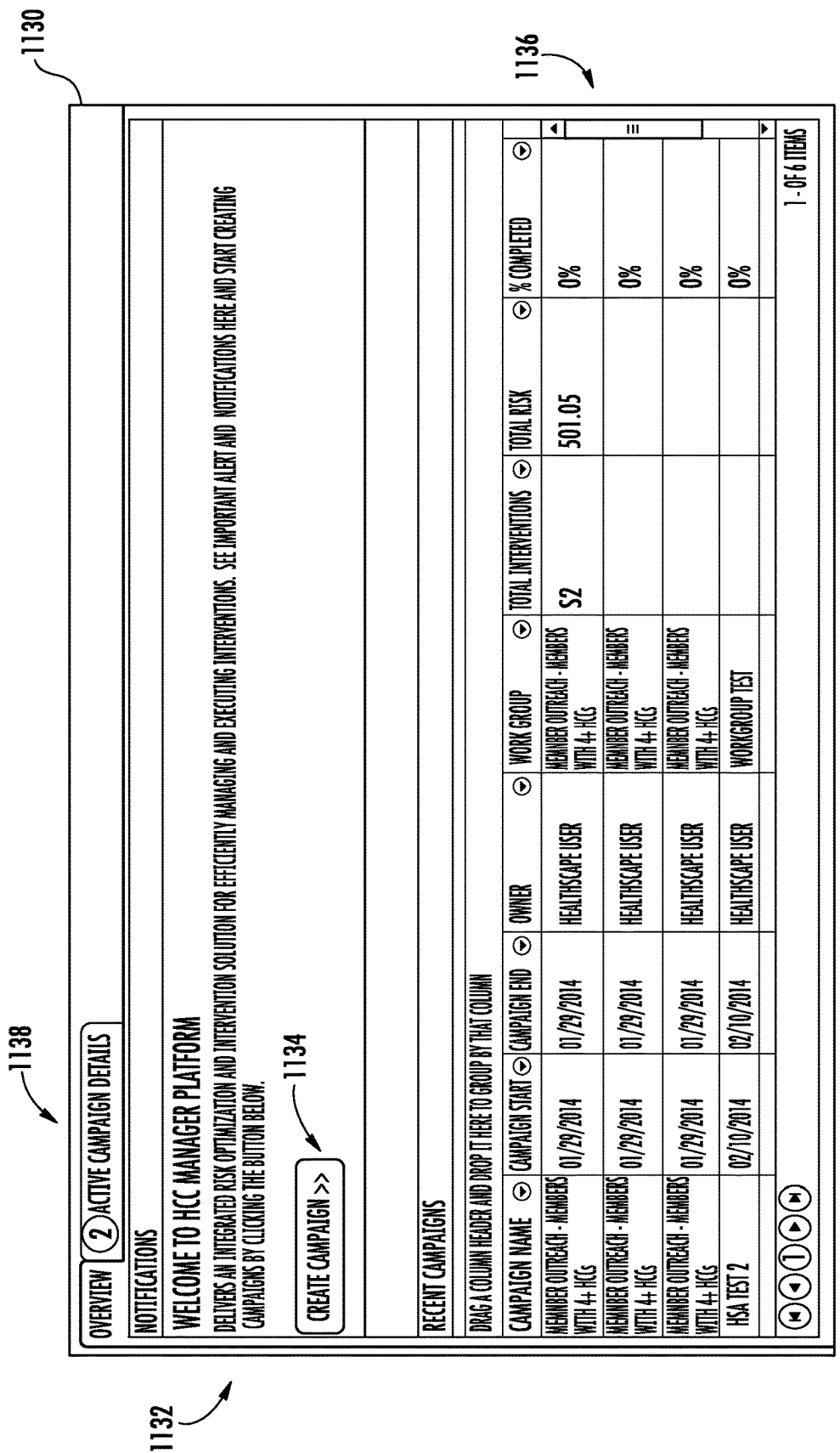
FIG. 11 depicts a user interface that provides a manager platform, according to one or more embodiments shown and described herein.

Accordingly, FIG. 11 depicts a user interface 1130 that provides a manager platform (such as may be provided by the manager user computing device 102b), according to one or more embodiments shown and described herein. As illustrated, the user interface 1130 includes a notifications section 1132, which includes a create campaign option 1134, a recent campaigns section 1136, and a details option 1138. Accordingly, the create campaign option 1134 allows the manager to create a new campaign. A campaign may be utilized as a manager-defined analysis of one or more members, and/or providers. Also included in the recent campaigns is a listing of campaigns that have recently been created, edited, and/or viewed. Accordingly, the campaigns may be listed with a campaign name category, campaign start category, a campaign end category, an owner category, a work group category, a total interventions category, a total risk category, and a percent completed category. The details option 1138 may provide additional details on previously created campaigns.

FIG. 12 depicts a user interface 1230 that provides details of an active campaign, according to one or more embodiments shown and described herein. In response to selection of the details option 1138 from FIG. 11, the user interface 1230 may be provided. As illustrated, the user interface 1230 includes a details section 1232, a campaign detail section 1234, a descriptive statistics section 1236, and an overview option 1238. The details section 1232 may include a campaign name category, a campaign start category, a campaign end category, an owner category, and a creation date category. The campaign detail section 1234 includes a list of one or more targeted analysis focuses. The descriptive statistics section 1236 includes one or more statistics, such as a number of interventions created, a number of interventions completed, a number of interventions in progress, a number of interventions not started, and/or others.

FIG. 13 depicts a user interface 1330 that provides one or more options for creating a new campaign, according to one or more embodiments shown and described herein. In response to selection of the create campaign option 1134, the user interface 1330 is provided. As illustrated, the user interface 1230 includes a details section 1232, a campaign list builder section 1334, and a campaign workflow section 1336. Specifically, the campaign information section 1332 includes a campaign name field, a start date field, an end date field, a campaign notes field, and a campaign owner field.

The campaign list builder section 1334 includes a campaign type field, a source report field, and a view list option. The campaign workflow section 1336 includes a tasks field, a user field, a workgroup name field, a notification field, a workgroup email address field, and a predecessor field.

FIG. 14 depicts a user interface 1430 that provides data related to campaign activity, according to one or more embodiments shown and described herein. In response to selection of one of the campaigns in the recent campaigns section 1136 (FIG. 11), the user interface 1430 may be provided. As illustrated, the user interface 1430 includes a workgroup section 1432 and an unassigned list section 1434. The workgroup section 1432 may provide one or more workgroups associated with a selected campaign. Additional information and/or options may be provided, such as a name, members, interventions, and percent completed. The unassigned list option may include a list of members who are not currently assigned to a campaign. Accordingly, the unassigned list section 1434 may include a member identifier category, a line of business (LOB) category, a metal level category, an age category, a captured HCC category, a suspect HCC category, a risk score category, a potential risk score category, and an expected risk score category.

Figure 15:
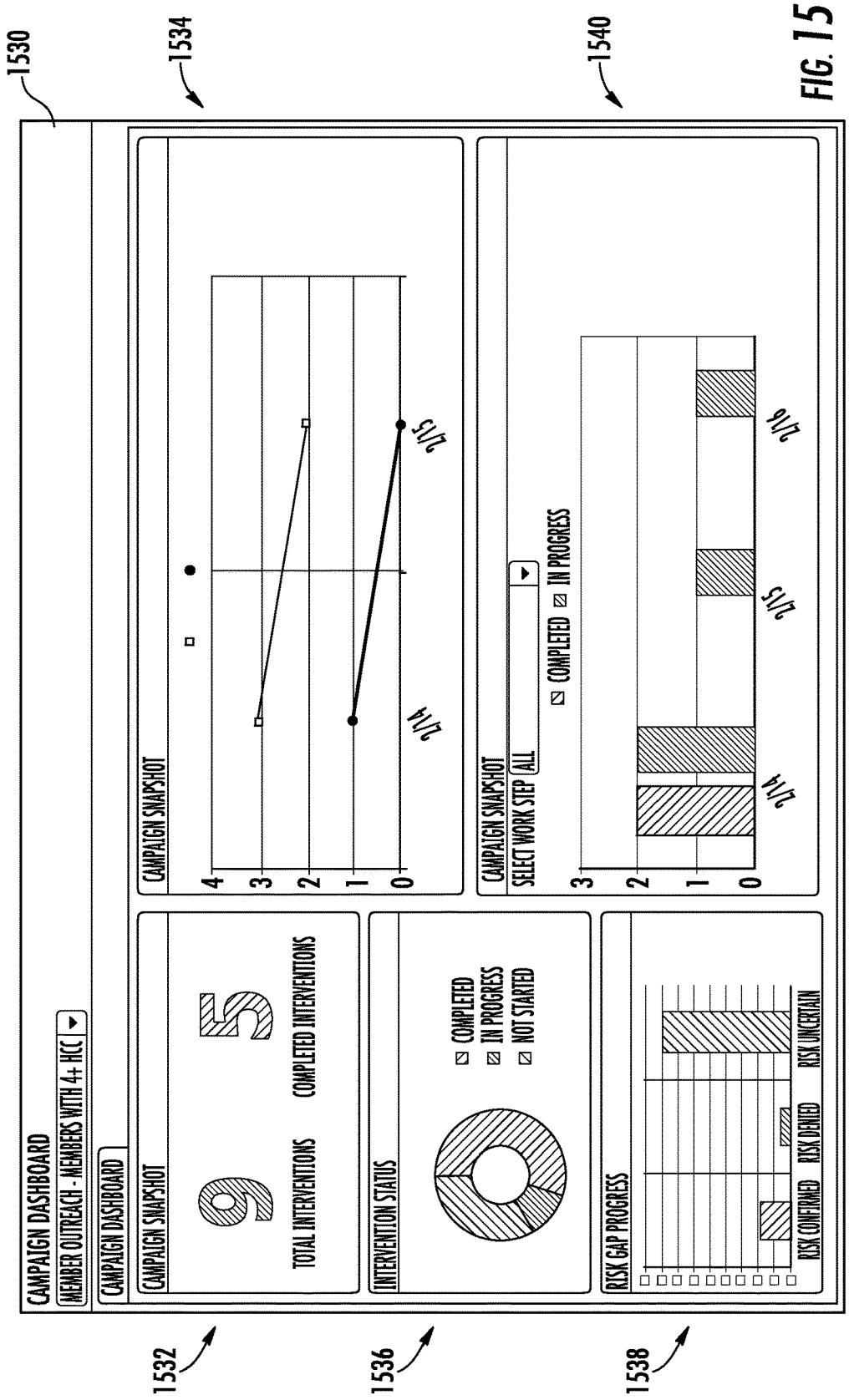
FIG. 15 depicts a user interface that provides a campaign dashboard, according to one or more embodiments shown and described herein.

FIG. 15 depicts a user interface 1530 that provides a campaign dashboard, according to one or more embodiments shown and described herein. As illustrated, the user interface 1530 may provide a campaign snapshot section 1532, a campaign daily interventions section 1534, an intervention status section 1536, a risk gap progress section 1538, and a daily activity tracking section 1540. Specifically, the campaign snapshot section 1532 may provide information regarding a number of total interventions, and data related to completed interventions for a campaign. The campaign daily interventions section 1534 may provide a data related to completed interventions for a particular day versus comp interventions that were in progress for that day, month, and/or quarter. Progression data may be provided and/or graphed to illustrate trends of this information over time. The intervention status data may provide the current status of interventions for this campaign. As an example, completed interventions, in progress interventions, and not started interventions may be provided textually and/or graphically. In the risk gap progress section 1538, risk gap data may be divided into risk confirmed, risk denied, and risk uncertain. This data may then be compared and/or graphically depicted. The daily activity tracking section 1540 may provide a work step option f or selecting the data to be provided in the daily activity tracking section 1540. Additionally information, such as completed and in progress interventions may be provided for one or more time periods.

Figure 16:
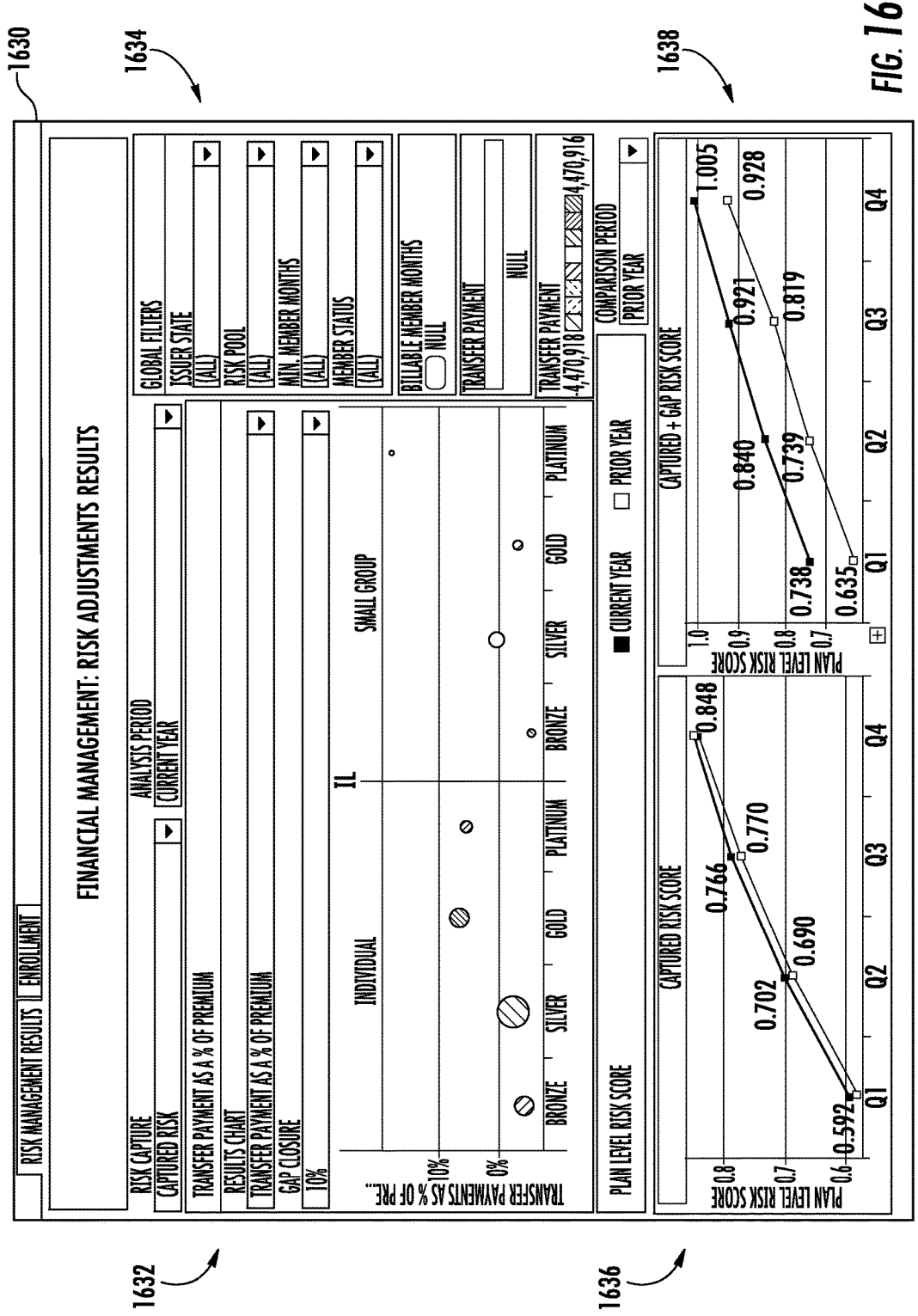
FIG. 16 depicts a user interface that provides risk management results for a predetermined risk, according to one or more embodiments shown and described herein.
Figure 17:
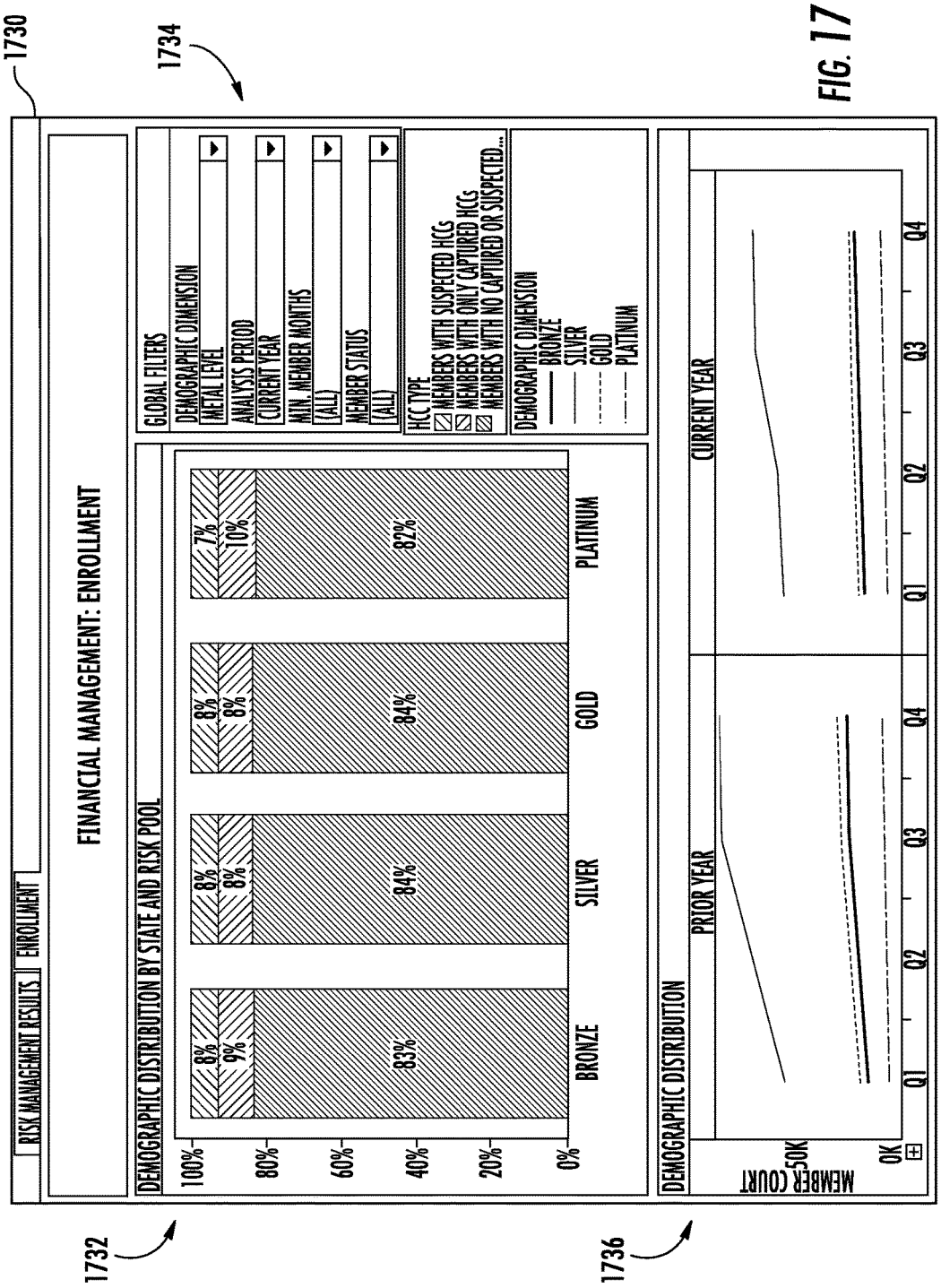
FIG. 17 depicts a user interface that provides demographic distribution of risk, according to one or more embodiments shown and described herein.

Additionally, embodiments disclosed herein provide financial management functionality. As an example, FIGS. 16 and 17 provide executive and summary level dashboards to track and monitor key metrics relating to the risk adjustment and reinsurance programs (e.g., risk scores, transfer payments, reinsurance receivables, etc.) incorporating both captured risk and risk gaps. These user interfaces also provide the ability to segment results by various dimensions (e.g., state, market segment, risk pool, etc.) for deeper analysis, as well as the ability to drill down to plan level or member level results. In addition, FIGS. 16 and 17 provide user with a comparison and reconciliation of the risk score and prioritize data records submitted to HHS that were returned with errors based on the risk adjustment and/or reinsurance impact (e.g., prioritize error records with the greatest financial impact to a client's transfer payment and/or reinsurance reimbursement).

FIG. 16 depicts a user interface 1630 that provides risk management results for a predetermined risk, according to one or more embodiments shown and described herein. As illustrated, the user interface 1630 includes a transfer payment section 1632, which includes a risk capture option, an analysis period option, results chart option, a gap closure option, as well as a plan risk score portion. The risk capture option may provide the user with the ability to specify a risk capture type, the analysis period option allows the user to specify a predetermined period for the data provided in the user interface 1630. Similarly, the results chart option allows the user to determine the type of information provided in the user interface 1630. The gap closure option provides the user with the ability to specify a percentage for depicting a gap closure. Additionally, the plan level risk score portion provides a graphical representation of the selected data.

Additionally, the filters section 1634 provides an issuer state option, a risk pool option, a minimum member of months option, a member status option, a billable member months portion, and a transfer payment portion. Also provided is a comparison period option for a user to select a period to compare captured risk score and captured gap risk score. The captured risk score section 1636 provides a graphical representation of the data selected in the user interface 1630. The captured plus gap risk score section 1638 provides the captured risk score plus the gap risk score as a graphical representation of the data specified in the user interface 1630.

FIG. 17 depicts a user interface 1730 that provides demographic distribution of risk, according to one or more embodiments shown and described herein. As illustrated, the user interface 1730 includes a demographic distribution by state section 1732, a filters section 1734, and a demographic distribution section 1736. The demographic distribution by state section 1732 includes a graphical representation of a percentage of total member count by demographic dimension (e.g., metal levels, such as bronze, silver, gold, platinum, etc.) and an HCC type, which may include a categorization of members based on their captured and/or gap risk score. Additionally, the filters section 1734 includes a demographic dimension option, an analysis period portion, a minimum member months option, and a member status option. The demographic distribution section 1736 includes a graphic representation of member count over one or more predetermined time periods.

Additionally, FIGS. 18-22 provide integrated member economics. Specifically, these embodiments provide clients with a platform to analyze their member populations in function-specific views (e.g., marketing, product, actuarial, and provider network). These embodiments allow users to segment membership, perform root cause analysis, identify correlations/relationships between various diagnostic and demographic dimensions in order to ultimately identify the populations that drive both positive and negative economic value. Some embodiments may provide views that incorporate both captured risk and target risk (based on risk gaps) and also provide the ability to drill down to specific providers and members. Still some embodiments may allow clients to gain deeper insight into their membership and understand the key drivers of financial performance in the post-ACA market. Accordingly, the integrated member economics, as described herein, may represent the integration of HCC sentinel's diagnostic coding gap identification algorithms and member and issuer level scoring analytics, as well as proprietary member economics analytics employed by the remote computing device 104 described herein.

Accordingly, embodiments may be configured to integrate coding gap identification with the economic value determinations within member economics to determine a member's post risk adjusted premium value excluding coding gaps and including coding gaps. As a result, adverse economic outcomes at the member level can be concretely segregated between revenue management coding gap economic value cost in excess of the condition specific normalized value that is created by the market's risk adjusted premium results. The integrated member economics also considers the members full cost view which not only includes member specific claims cost but also plan specific fixed and variable administrative costs, value based provider incentives payments attributed to the member, and claims costs associated with the YTD completion factor.

Additionally, clinical management functionality may be provided including overall profit or loss generated by members with conditions. This information may be provided by condition to understand the areas of focus required to improve overall health management cost reduction. This and other analyses may be segregated between the impacts of revenue management issues versus cost management issues. Additionally, detailed decile analysis of each condition may be provided to understand what drives profitability of high decile members and losses for low decile members. Clinical program decile analysis to understand what drives profitability of high decile members and losses for low decile members to improve program design and outcomes. Segregation of analytics between chronic, multi-year and episodic member cohorts may be performed to understand the relative financial importance, population size and economic value distribution of each of these unique risk adjusted member groups.

Similarly, some embodiments may provide analytics of provider economic performance segregated by revenue management versus cost management results, analytics of provider program (e.g., ACO's, PCMH's, provider partnerships, etc.) performance segregated by revenue management versus cost management results, and/or evaluation of provider in managing specific conditions segregated by revenue management versus cost management results. Some embodiments may provide evaluation of economic performance of provider based products and the related root causes of superior or inferior financial performance, and/or evaluation of the optimal provider system/group targeting for partnership opportunities based on economic performance related to by revenue and cost management.

Some embodiments may provide product and/or marketing analysis and/or data. Specifically, embodiments may provide an overall understanding of premium market share redistribution resulting from post risk adjusted premium, an overall understanding of premium levels for various unique cohorts on a post risk adjusted basis, and/or an understanding of economic performance (both revenue and cost management related) along various lines. This information may be provided by product or product family, by benefit structure category, by formulary structure category, by contract type and demographic factors, and/or others.

Embodiments may also provide an understanding of a financial consequence of churn and member retention based on member months and enrollment life span duration analysis of economic results, geographic economic performance, small group economic performance by group size, analytics to support future product design based on the historic results and root cause analysis of superior and inferior product performance and/or support in assessing the impact of Network configuration and clinical management for purposes of market rule pricing under ACA. Similarly, some embodiments may provide specific quantification of total economic value of lost revenue resulting from identified coding gaps which can be used for performance measurement, ROI and budgeting purposes and/or profitability of members with supplemental records to understand the effectiveness of various intervention strategies. Some embodiments may be configured to identify and prioritize gaps in care and quality gaps based on various industry standard measures (e.g., CMS star ratings, healthcare effectiveness data and information set (HEDIS), etc.), align revenue-side and cost-side gaps for intervention tactics, and/or perform root-cause analysis and reporting from a holistic revenue management and cost management perspective.

Figure 18:
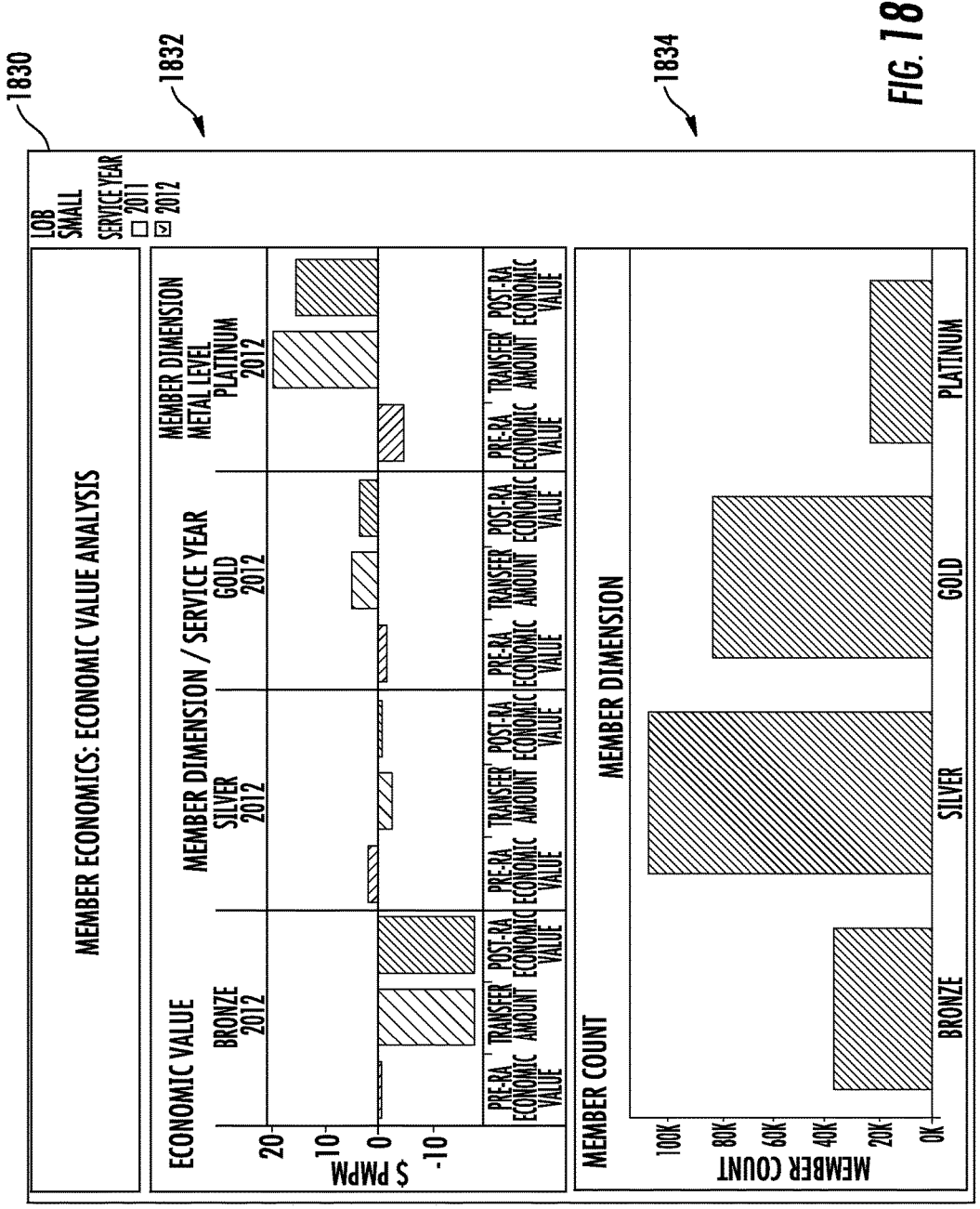
FIG. 18 depicts a user interface that provides an economic value analysis, according to one or more embodiments shown and described herein.

Referring again to the drawings, FIG. 18 depicts a user interface 1830 that provides an economic value analysis, according to one or more embodiments shown and described herein. As illustrated, the user interface 1830 includes an economic value section 1832 and a member count section 1834. The economic value section 1832 provides a member dimension per member per month (PMPM) and service year versus a dollar value for pre-risk adjusted (RA) economic value, transfer amount, and post-RA economic value. The member count section 1834 provides a member count for a plurality of different demographic dimensions.

Figure 19:
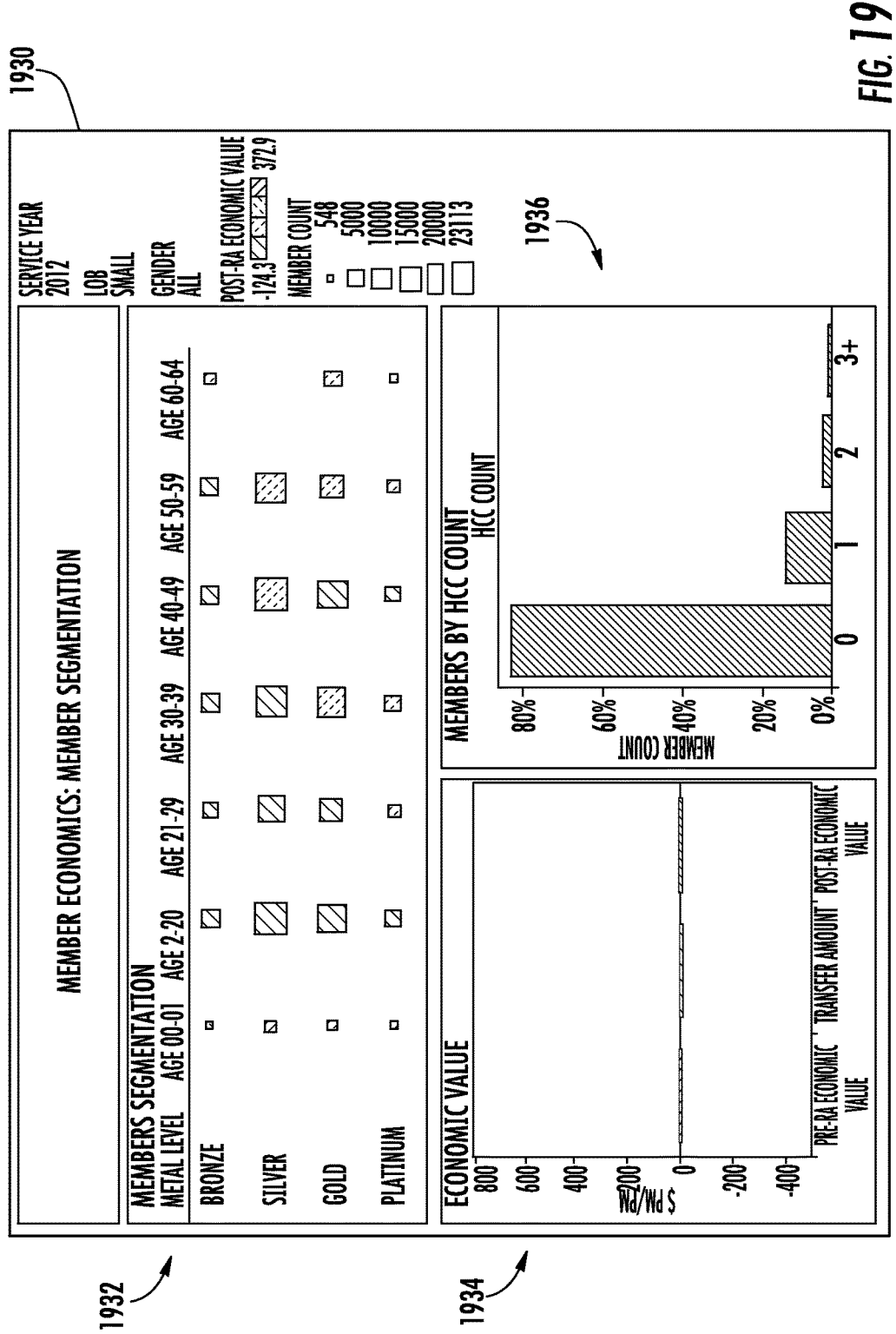
FIG. 19 depicts a user interface that provides member economics associated with member segmentation, according to one or more embodiments shown and described herein.

FIG. 19 depicts a user interface 1930 that provides member economics associated with member segmentation, according to one or more embodiments shown and described herein. As illustrated, the user interface 1930 includes a members segmentation section 1932, an economic value section 1934, and a members by HCC count section 1936. Specifically, the members segmentation section 1932 provides a plurality of metal levels for different age classifications. The economic value section 1934 provides a value versus pre-RA economic value, transfer amount, and post-RA economic value. The members by HCC count section 1936 provides member count versus HCC count.

Figure 20:
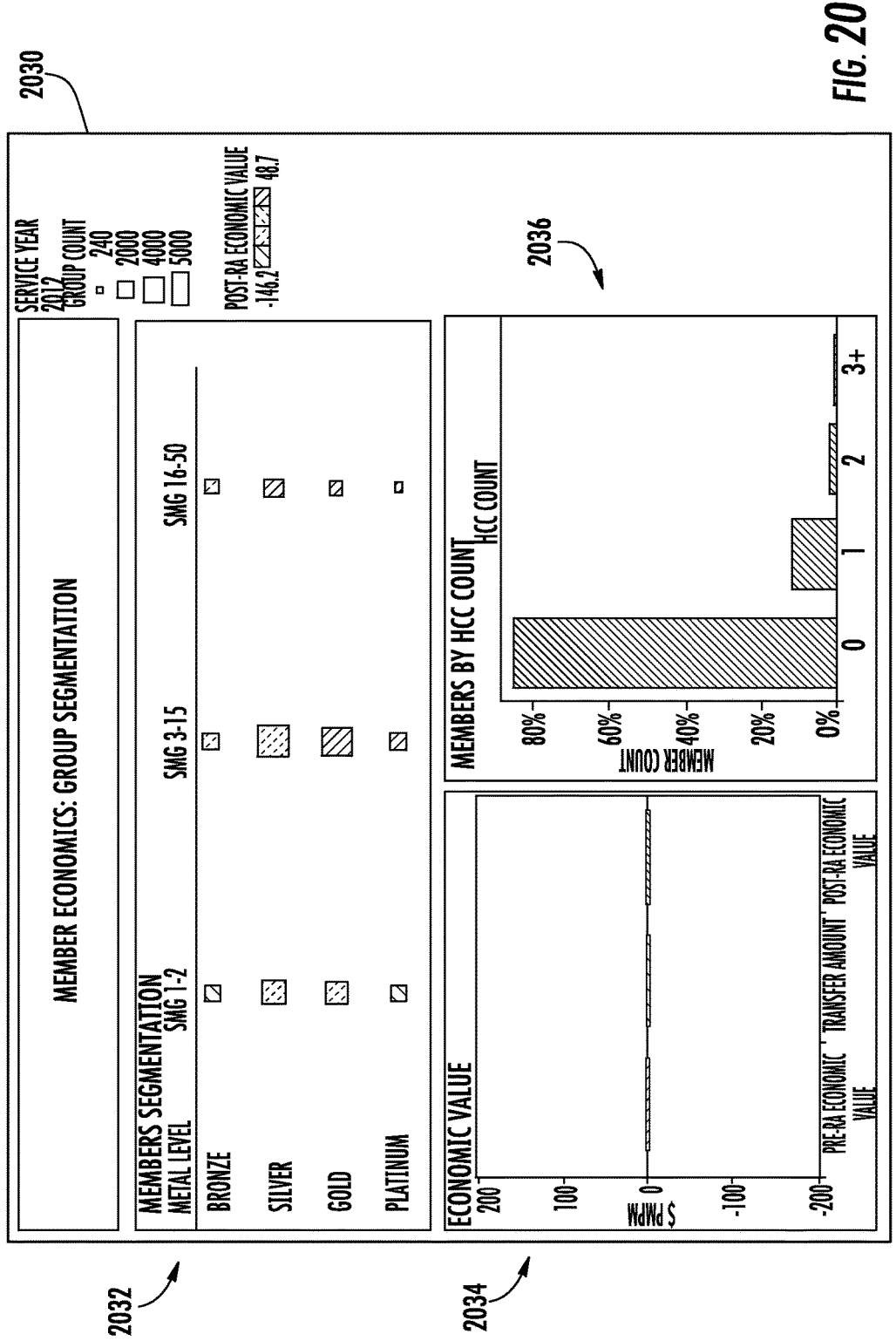
FIG. 20 depicts a user interface that provides member economics associated with a group segmentation, according to one or more embodiments shown and described herein.

FIG. 20 depicts a user interface 2030 that provides member economics associated with a group segmentation, according to one or more embodiments shown and described herein. As illustrated, the user interface 2030 includes a group segmentation section 2032, an economic value section 2034, and a members by HCC count section 2036. Specifically, the group segmentation section 2032 provides a plurality of metal levels for different age classifications. The economic value section 2034 provides a value versus pre-RA economic value, transfer amount, and post-RA economic value. The members by HCC count section 2036 provides member count versus HCC count.

While the user interface 2030 provides similar information as the user interface 1930 from FIG. 19, it will be understood that the user interface 1930 provides member segmentation and the user interface 2030 provides group segmentation information, such as segmentation of members within group health plans.

Figure 21:
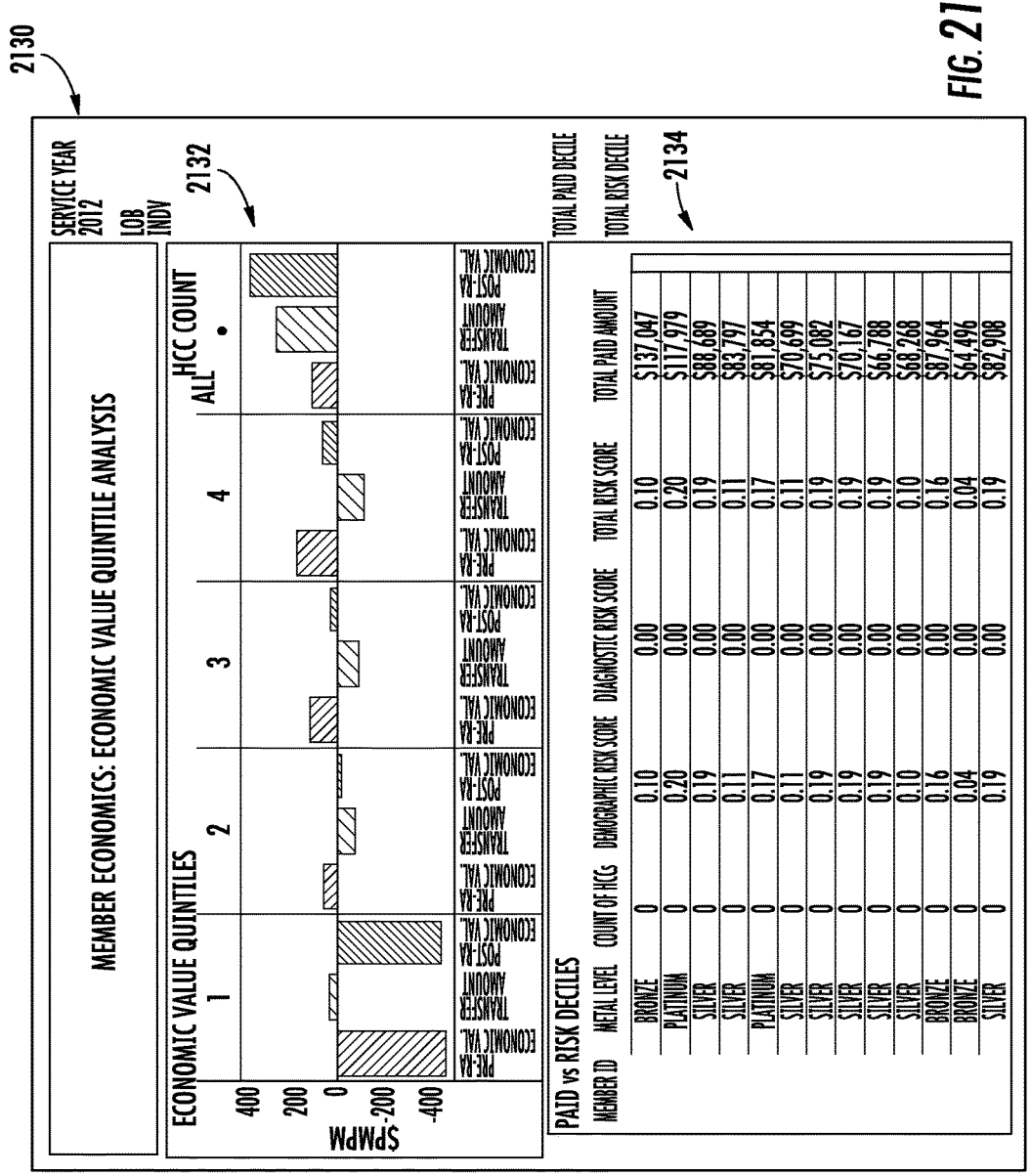
FIG. 21 depicts a user interface that provides an economic value quintile analysis, according to one or more embodiments shown and described herein.

FIG. 21 depicts a user interface 2130 that provides an economic value quintile analysis, according to one or more embodiments shown and described herein. As illustrated, the user interface 2130 includes an economic value quintiles section 2132 and a total paid amount (e.g., the carriers' incurred liability) versus risk deciles section 2134. Specifically, the economic value quintiles section 2132 includes a value versus pre-RA economic value, a transfer value, and a post-RA economic value for five quintiles. The paid versus risk deciles section 2134 provides a metal level category, a count of HCCs category, a demographic risk score category, a demographic risk score category, a total risk score category, and a total paid amount category.

Figure 22:
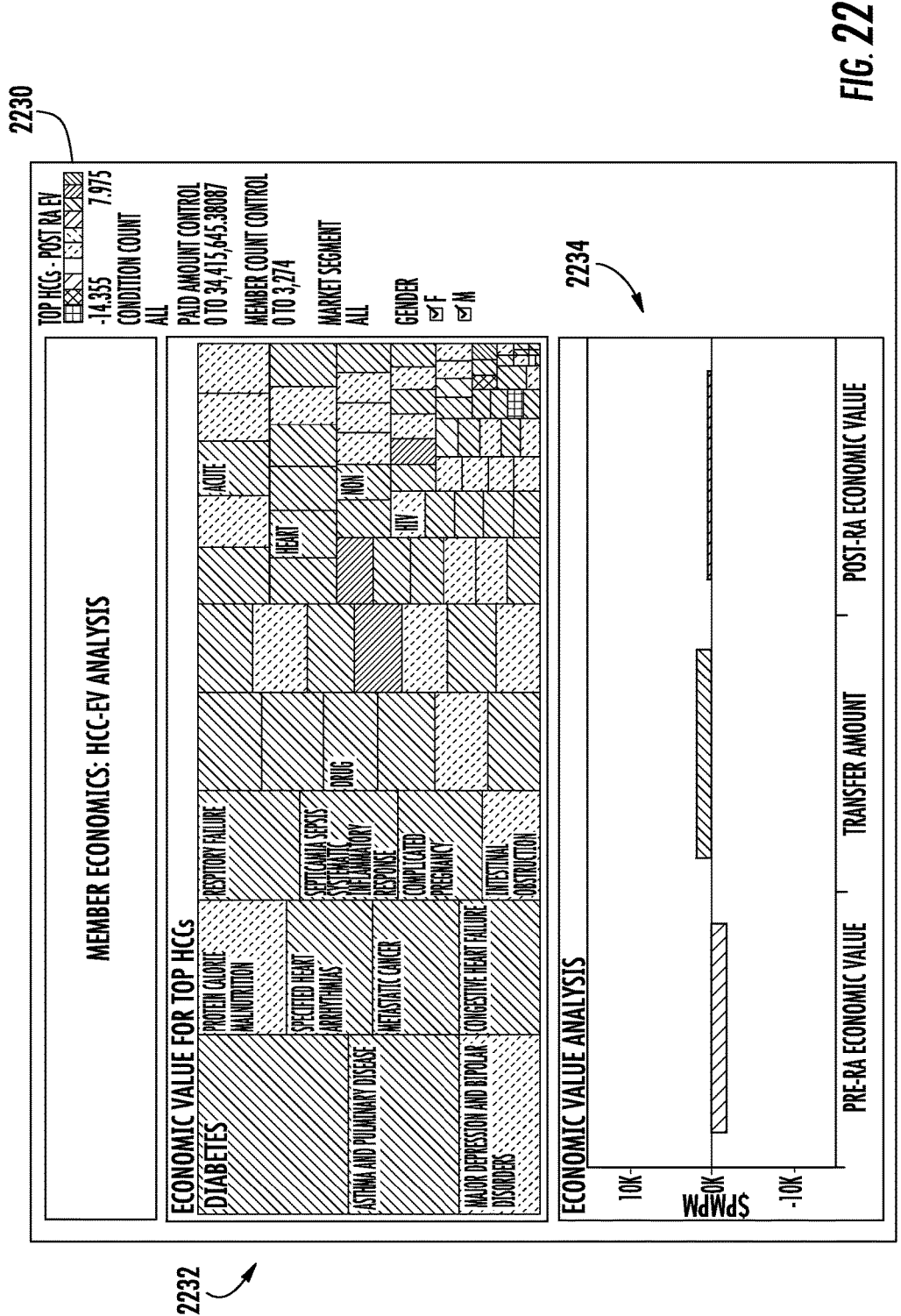
FIG. 22 depicts a user interface that provides economic value data for hierarchical condition categories, according to one or more embodiments shown and described herein.

FIG. 22 depicts a user interface 2230 that provides economic value data for hierarchical condition categories, according to one or more embodiments shown and described herein. As illustrated, the user interface 2230 includes an economic value for top HCCs section 2232 and an economic value analysis section 2234. The economic value for top HCCs section 2232 includes a listing of one or more medical conditions, which may be depicted according to size and/or color to identify a relative economic value. The economic value analysis section 2234 provides pre-RA economic value, transfer amount, and post-RA economic value versus a total value.

Figure 23:
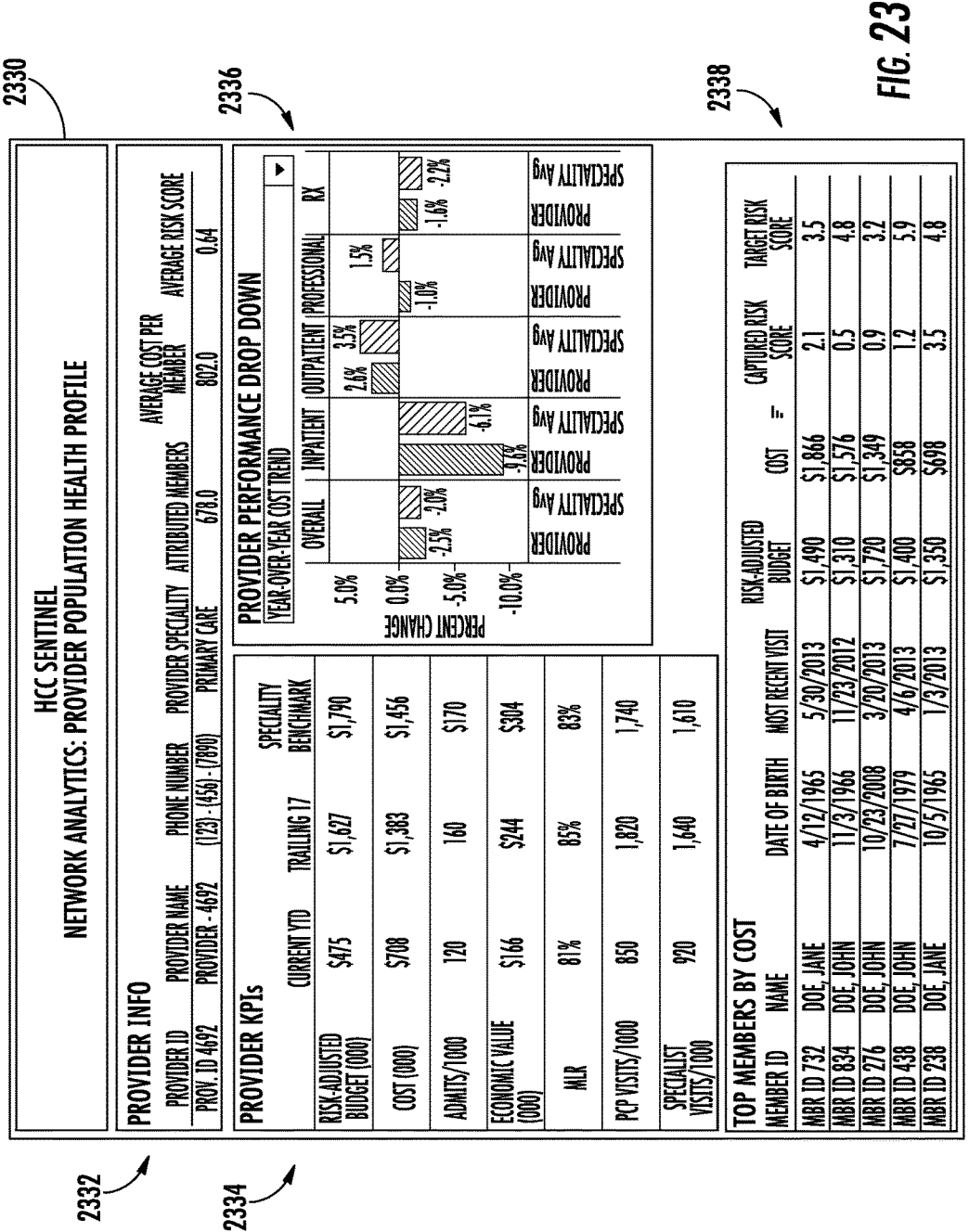
FIG. 23 depicts a user interface that provides provider population health profile data, according to one or more embodiments shown and described herein.

FIG. 23 depicts a user interface 2330 that provides provider population health profile data, according to one or more embodiments shown and described herein. As illustrated, through the expansion of current provider analytics, embodiments may be configured to apply revenue-focused metrics (e.g., through risk adjustment), clinical/quality metrics, and/or other key performance indicators to assist clients in developing value-based reimbursement models. This may include identification and prioritization of providers for risk sharing contracts and creation of virtual provider groups, the ability to evaluate, track, and monitor performance of providers in risk sharing contracts, and/or the ability to provide detailed information, such as through provider profiles, etc. to share with providers in order to optimize risk sharing/revenue for both the carrier and the provider. Specifically, the user interface 2330 provides a provider information section 2332, a provider KPIs section 2334, a provider performance section 2336, and a top members by cost section 2338. The provider information section 2332 information regarding a medical provider, such as provider identifier, provider name, phone number, provider specialty, attributed members, average cost per member, and average risk score. The provider KPIs section 2334 provides risk adjusted budget, cost, admits, economic value, MLR, primary care physician visits, and specialist visits for the current year, past twelve months, and specialty benchmarks.

The provider performance section 2336 includes a provider performance option, as well as a percent change for inpatient, outpatient, professional, and prescription costs for provider and specialty average. The top members by cost section 2338 provides a member identifier category, a name category, a date of birth category, a most recent visit category, a risk adjusted budget category, a cost category, a captured risk score category, and a target risk score category.

Figure 24:
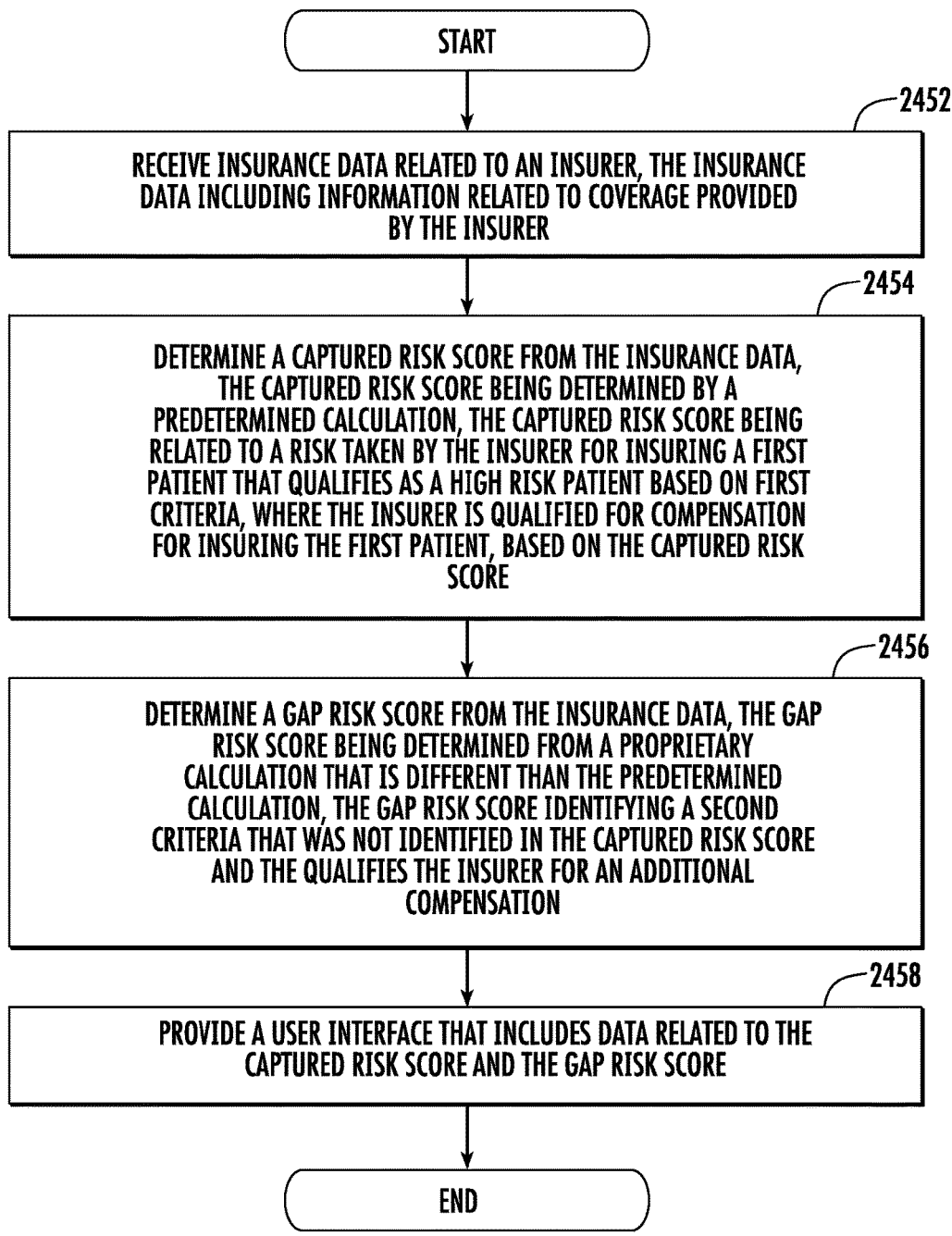
FIG. 24 depicts a flowchart for providing insurer risk data, according to one or more embodiments shown and described herein.

FIG. 24 depicts a flowchart for providing insurer risk data, according to one or more embodiments shown and described herein. As illustrated in block 2452, insurance data related to an insurer is received, wherein the insurance data includes information related to coverage provided by the insurer. In block 2454, a captured risk score is determined from the insurance data, where the captured risk score is determined by a predetermined calculation. The captured risk score may also be related to a risk taken by the insurer for insuring a first patient that qualifies as a high risk patient, based on first criteria, where the insurer is qualified for compensation for insuring the first patient, based on the captured risk score. In block 2456, a gap risk score is determined from the insurance data. The gap risk score may be determined from a proprietary calculation that is different than the predetermined calculation. The gap risk score may identify a second criteria that was not identified in the captured risk core and qualifies the insurer for an additional compensation. In block 2458, a user interface is provided that includes data related to the captured risk score and the gap risk score.

Accordingly, embodiments described herein may be configured to provide a dynamic scoring model with time periods analyzed. Specifically, embodiments may be configured to dynamically run HHS-HCC risk adjustment model for dynamic time periods (e.g., by year, multi-year, quarterly results, monthly results, etc.) Similarly, embodiments may be configured to alter and/or customize parameters of the HHS-HCC risk adjustment model to perform one or more scenario analysis (e.g., alter the demographic/product variables, utilize claim types not typically accepted by the model, ability to analyze populations not included in the risk adjustment model, etc.).

Some embodiments may gain deeper insight into health plan drivers of profitability. This feature calculates member-level economic consequences, which is a measure of a member's net value after any transfer payments and reinsurance receivables (scenario modeling allows for one or both of the payments and/or charges to be included or excluded. As an example, this embodiment may determine a pre-risk adjusted economic value (such as a pre-risk adjusted premium), a post-risk adjusted economic value (such as a post-risk adjusted premium), a pre-reinsurance economic value and/or a post-reinsurance economic value. Economic value may be calculated based on captured risk and/or target risk. This analysis and other financial views provide insight to the individual and/or member level, which is not available in current solutions.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing insurer risk data, comprising:
   receiving, by a computing device, insurance data related to an insurer, the insurance data including information related to coverage provided by the insurer;
   determining, by the computing device, a captured risk score from the insurance data over a dynamic time period, the captured risk score being determined by a predetermined calculation, the captured risk score being related to a risk taken by the insurer for insuring a first patient that qualifies as a high risk patient, based on first criteria, wherein the insurer is qualified for compensation for insuring the first patient, based on the captured risk score;
   determining, by the computing device, a gap risk score from the insurance data, the gap risk score being determined from a proprietary calculation that is different than the predetermined calculation, the gap risk score identifying a second criteria that was not identified in the captured risk score and that qualifies the insurer for an additional compensation;
   identifying a plurality of diagnostic and demographic dimensions associated with the first patient to identify a population that drives economic value associated with the gap risk score;
   applying a user-defined diagnostic and demographic dimension associated with the first patient to a plurality of patients to identify the population that derives economic value associated with the gap risk score;
   calculating a member-level economic consequence, based on the population and the gap risk score;
   providing, by the computing device, a user interface that includes data related to the captured risk score, the gap risk score, and data related to the economic value
   via the user interface, soliciting a user input to commence a campaign comprising an intervention to reduce the gap risk score;
   receiving data related to risk gap closure associated with the intervention; and
   refining a risk gap targeting algorithm based at least in part on the received data related to the risk gap closure.

2. The method of claim 1, further comprising determining, from the insurance data, a risk gap source distribution for identifying the gap risk score.

3. The method of claim 1, further comprising determining, from the insurance data, the captured risk score and the gap risk score for a plurality of hierarchical condition categories (HCC).

4. The method of claim 1, further comprising determining, from the insurance data, a medical provider performance statistic, associated with a plurality of predetermined medical specialties, based on at least one of the following: the gap risk score and the captured risk score.

5. The method of claim 1, further comprising determining a financial consequence associated with the gap risk score.

6. The method of claim 5, wherein the financial consequence includes a transfer payment as a percentage of a premium.

7. The method of claim 5, wherein the financial consequence includes an economic value based on at least one of the following: a pre-risk adjusted (RA) premium, a pre-RA economic value, a transfer amount, a post-RA economic value, and a post-RA premium.

8. The method of claim 5, wherein determining the financial consequence includes calculating an economic contribution of a plurality of members.

9. The method of claim 8, wherein calculating the economic contribution includes calculating the economic contribution utilizing at least one of the following: the captured risk score and the gap risk score.

10. A system for providing insurer risk data, comprising:
    a processor; and
    a memory component that is coupled to the processor, the memory component storing logic that, when executed by the processor, causes the system to perform at least the following:
    receive insurance data related to an insurer, the insurance data including information related to coverage provided by the insurer;
    determine a captured risk score from the insurance data, the captured risk score being determined by a predetermined calculation, the captured risk score being related to a risk taken by the insurer for insuring a first patient that qualifies as a high risk patient, based on first criteria, wherein the insurer is to be compensated for insuring the first patient, based on the captured risk score;
    determine a gap risk score from the insurance data, the gap risk score being determined from a proprietary calculation that is different than the predetermined calculation, the gap risk score identifying a second criteria that was not identified in the captured risk score and that qualifies the insurer for an additional compensation;

identify a plurality of diagnostic and demographic dimensions associated with the first patient to identify a population that drives economic value associated with the gap risk score;

calculate a member-level economic consequence, based on the population and the gap risk score;

provide a user interface that includes data related to at least one of the following: the captured risk score, the gap risk score, and the member-level economic consequence;

via the user interface, solicit a user input to commence a campaign comprising an intervention to reduce the gap risk score;

receive data related to risk gap closure associated with the intervention; and refine a risk gap targeting algorithm based at least in part on the received data related to the risk gap closure.

11. The system of claim 10, wherein the logic further causes the system to determine, from the insurance data, a risk gap source distribution for identifying the gap risk score.

12. The system of claim 10, wherein the logic further causes the system to determine, from the insurance data, the captured risk score and the gap risk score for a plurality of hierarchical condition categories (HCC).

13. The system of claim 10, wherein the logic further causes the system to determine, from the insurance data, a medical provider performance statistic, associated with a plurality of predetermined medical specialties, based on the gap risk score.

14. The system of claim 10, wherein the member-level economic consequence includes an economic value based on at least one of the following: a pre-risk adjusted (RA) premium, a pre-RA economic value, a transfer amount, a post-RA economic value, and a post-RA premium.

15. A non-transitory computer-readable medium for providing insurer risk data that includes logic that, when executed by a processor, causes a computing device to perform at least the following:

receive insurance data related to an insurer over a dynamic time period, the insurance data including information related to coverage provided by the insurer;

determine a captured risk score from the insurance data, the captured risk score being determined by a predetermined calculation, the captured risk score being related to a risk taken by the insurer for insuring a first patient that qualifies as a high risk patient based on first criteria, wherein the insurer is to be compensated for insuring the first patient, based on the captured risk score;

determine a gap risk score from the insurance data, the gap risk score being determined from a proprietary calculation that is different than the predetermined calculation, the gap risk score identifying a second criteria that was not identified in the captured risk score and that qualifies the insurer for an additional compensation;

identify a plurality of diagnostic and demographic dimensions associated with the first patient to identify a population that drives economic value associated with the gap risk score;

calculate a member-level economic consequence, based on the population and the gap risk score;

provide a user interface that includes data related to the captured risk score and the gap risk score via the user interface, solicit a user input to commence a campaign comprising an intervention to reduce the gap risk score;

receive data related to risk gap closure associated with the intervention; and refine a risk gap targeting algorithm based at least in part on the received data related to the risk gap closure.

16. The non-transitory computer-readable medium of claim 15, wherein the logic further causes the computing device to determine, from the insurance data, a risk gap source distribution for identifying the gap risk score.

17. The non-transitory computer-readable medium of claim 15, wherein the logic further causes the computing device determine, from the insurance data, the captured risk score and the gap risk score for a plurality of hierarchical condition categories (HCC).

18. The non-transitory computer-readable medium of claim 15, wherein the logic further causes the computing device determine, from the insurance data, a medical provider performance statistic, associated with a plurality of predetermined medical specialties, based on the gap risk score.

19. The non-transitory computer-readable medium of claim 15, wherein the financial consequence includes an economic value based on at least one of the following: a pre-risk adjusted (RA) premium, a pre-RA economic value, a transfer amount, a post-RA economic value, and a post-RA premium.

20. The non-transitory computer-readable medium of claim 15, wherein the logic further causes the computing device to calculate an economic contribution of a plurality of members, wherein calculating the economic contribution includes calculating the economic contribution utilizing at least one of the following: the captured risk score and the gap risk score.

* * * * *